US010750056B2

(12) United States Patent
Tanaka

(10) Patent No.: US 10,750,056 B2
(45) Date of Patent: Aug. 18, 2020

(54) COLOR CHART FOR COLOR SELECTION, METHOD FOR PRODUCING COLOR CHART FOR COLOR SELECTION, AND DEVICE FOR PRODUCING COLOR CHART FOR COLOR SELECTION

(71) Applicant: SEIKO EPSON CORPORATION, Tokyo (JP)

(72) Inventor: Katsuyuki Tanaka, Nagano (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 16/012,903

(22) Filed: Jun. 20, 2018

(65) Prior Publication Data

US 2018/0376032 A1 Dec. 27, 2018

(30) Foreign Application Priority Data

Jun. 22, 2017 (JP) .................................. 2017-122243

(51) Int. Cl.
*G03G 15/00* (2006.01)
*H04N 1/60* (2006.01)
*G06K 15/10* (2006.01)
*G06K 15/00* (2006.01)

(52) U.S. Cl.
CPC ......... *H04N 1/6038* (2013.01); *G06K 15/102* (2013.01); *G06K 15/407* (2013.01); *H04N 1/6058* (2013.01); *H04N 1/6072* (2013.01); *H04N 1/6075* (2013.01); *H04N 1/6013* (2013.01)

(58) Field of Classification Search
CPC ...................... G03G 15/5041; G03G 15/5058
See application file for complete search history.

(56) References Cited

U.S. PATENT DOCUMENTS

| | | |
|---|---|---|
| 2011/0058196 A1 | 3/2011 | Teraue |
| 2011/0069332 A1 | 3/2011 | Katayama |
| 2011/0069333 A1 | 3/2011 | Katayama et al. |
| 2011/0075223 A1 | 3/2011 | Katayama |
| 2012/0075645 A1 | 3/2012 | Katayama et al. |
| 2012/0081722 A1 | 4/2012 | Katayama et al. |
| 2012/0162649 A1 | 6/2012 | Ishizaki et al. |
| 2014/0198328 A1 | 7/2014 | Katayama et al. |
| 2016/0156811 A1* | 6/2016 | Iwamoto ................ H04N 1/622 358/1.9 |
| 2018/0149521 A1 | 5/2018 | Fujino |

FOREIGN PATENT DOCUMENTS

| | | | |
|---|---|---|---|
| JP | 2008-072342 A | 3/2008 | |
| JP | 2008-072343 A | 3/2008 | |

(Continued)

*Primary Examiner* — Eric A. Rust
(74) *Attorney, Agent, or Firm* — Global IP Counselors, LLP

(57) ABSTRACT

A color chart for color selection to select a color patch of the closest color to a target color from among a plurality of the color patches, in which the color patch that represents colors of either an adjustment target color or a reference color that substitutes the adjustment target color is a target patch, a direction that represents a direction in which a color is to be adjusted from the target patch in the color chart for color selection is an adjustment direction, and the adjustment direction from the target patch is wider than the direction counter to the adjustment direction from the target patch.

17 Claims, 22 Drawing Sheets

(56) References Cited

FOREIGN PATENT DOCUMENTS

| | | | |
|---|---|---|---|
| JP | 2012-147411 | A | 8/2012 |
| JP | 5180936 | B2 | 4/2013 |
| JP | 5238650 | B2 | 7/2013 |
| JP | 5462756 | B2 | 4/2014 |
| JP | 5479837 | B2 | 4/2014 |
| JP | 2014-086930 | A | 5/2014 |
| JP | 5508975 | B2 | 6/2014 |
| JP | 5558995 | B2 | 7/2014 |
| JP | 5706979 | B2 | 4/2015 |
| JP | 2017-217789 | A | 12/2017 |
| JP | 2017-220866 | A | 12/2017 |
| JP | 2018-088615 | A | 6/2018 |
| JP | 2019-149658 | A | 9/2019 |

\* cited by examiner

FIG. 14
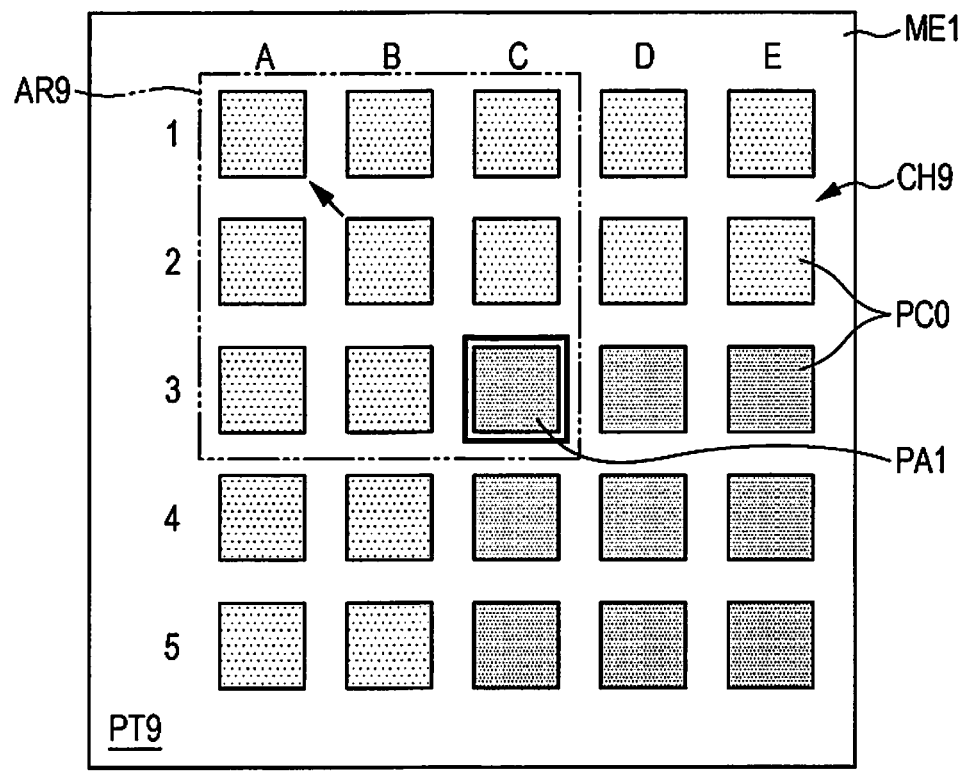
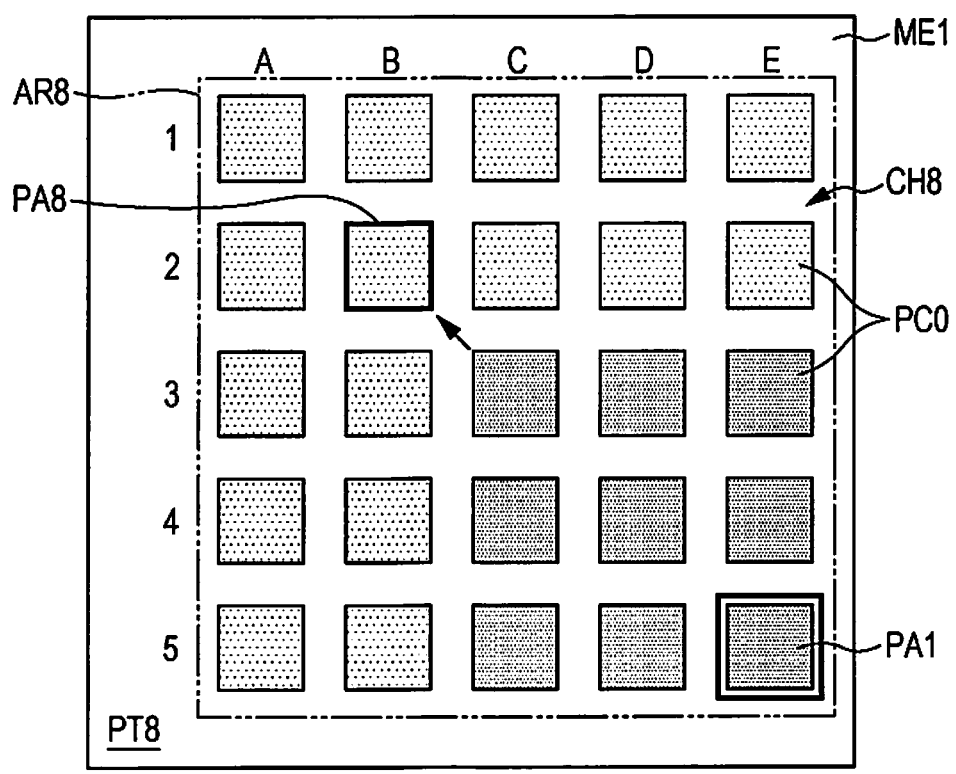

COLOR CHART FOR COLOR SELECTION, METHOD FOR PRODUCING COLOR CHART FOR COLOR SELECTION, AND DEVICE FOR PRODUCING COLOR CHART FOR COLOR SELECTION

BACKGROUND

1. Technical Field

The present invention relates to a color chart for color selection and a technique for producing the color chart for color selection.

2. Related Art

In a case where an ink jet printer is used in a calibration application for printing such as offset printing, required color reproduction precision (degree to which color is accurately reproduced) is extremely high. A color management system using an International Color Consortium (ICC) profile is used as a construction that reproduces such color. The ICC profile is data that represents a correspondence relationship between device-independent colors and device-dependent colors of a color device such as a printing machine (for example, an offset printing machine) or an ink jet printer. The device-dependent colors of the printing machine and the ink jet printer, for example, are represented by CMYK values that represent a usage amount of cyan (C), magenta (M), yellow (Y), and black (K). The device-independent colors, for example, are represented by a color value of an international commission on illumination (CIE) L*a*b* color space (hereinafter, Lab value will be used with "*" omitted) or a color value of a CIE XYZ color space that are device-independent color spaces.

In this arrangement, the ICC profile of the printing machine is an input profile, and the ICC profile of the ink jet printer is an output profile. When converting a CMYK value (set to a $CMYK_t$ value) in the printing machine to a color value (for example, Lab value) of a profile connection space (PCS) in accordance with an input profile, it is possible to convert the color value in the printing machine to a CMYK value ($CMYK_p$ value) of the ink jet printer in accordance with the output profile. When performing printing using an ink jet printer in accordance with the $CMYK_p$ value, it is possible to reproduce a color close to a color of the printing machine using the ink jet printer. In practice, there are cases where it is not possible to reproduce an anticipated color due to a profile error, a color measurement error, variation of a printer, or the like. In such a case, conversion precision of a target color is improved by correcting the ICC profile.

In order to obtain a color value used to correct the ICC profile, a color chart for color selection is printed by the printing machine or the ink jet printer, and each color patch of the color chart for color selection is measured by a color measuring device. An image processing system disclosed in JP-A-2014-86930 prints a calibration chart that includes all color and all tone patches, and obtains color measurement data by reading each patch of the calibration chart in an image reading unit.

In a case where there is no color measuring device or image reading unit, it is necessary to select a color patch of the color chart for color selection by visual inspection. Therefore, a color chart for color selection is desired that makes it possible to more easily search by visual inspection the closest color patch to a target color.

Note that, the problem as described above is not limited to a case where the ICC profile is corrected, and target colors may be matched to various color devices.

SUMMARY

An advantage of some aspects of the invention is to provide a technique that makes it possible to more easily search a target color patch.

According to an aspect of the invention, there is provided a color chart for color selection to select a color patch of the closest color to a target color from among a plurality of the color patches, in which the color patch that represents colors of either an adjustment target color or a reference color that substitutes the adjustment target color is a target patch, a direction that represents a direction in which a color is to be adjusted from the target patch in the color chart for color selection is an adjustment direction, and the adjustment direction from the target patch is wider than the direction counter to the adjustment direction from the target patch.

According to another aspect of the invention, there is provided a method for producing a color chart for color selection to select a color patch of the closest color to a target color from among a plurality of the color patches, the method including: specifying a color for receiving color specifications of an adjustment target; setting an adjustment direction for receiving a setting for the adjustment direction in which the color of the adjustment target is adjusted in a predetermined color space; and disposing a patch for disposing the color patch including the target patch in the color chart for color selection such that the adjustment direction from the target patch is wider than the direction counter to the adjustment direction from the target patch that represents either an adjustment target color or a reference color that substitutes the color of the adjustment target.

According to still another aspect of the invention, there is provided a program for producing a color chart for color selection, the program causing a computer to execute a function that corresponds to each step of the method for producing the color chart for color selection described above.

According to still another aspect of the invention, there is provided a device for producing a color chart for color selection, the device including a unit (portion) that corresponds to each step of the method for producing the color chart for color selection described above.

The aspects described above are able to provide a technique that makes it possible to more easily search a target color patch.

BRIEF DESCRIPTION OF THE DRAWINGS

The invention will be described with reference to the accompanying drawings, wherein like numbers reference like elements.

FIG. 14 is a diagram schematically illustrating an example of an action of a color chart for color selection.

DESCRIPTION OF EXEMPLARY EMBODIMENTS

Figure 1:
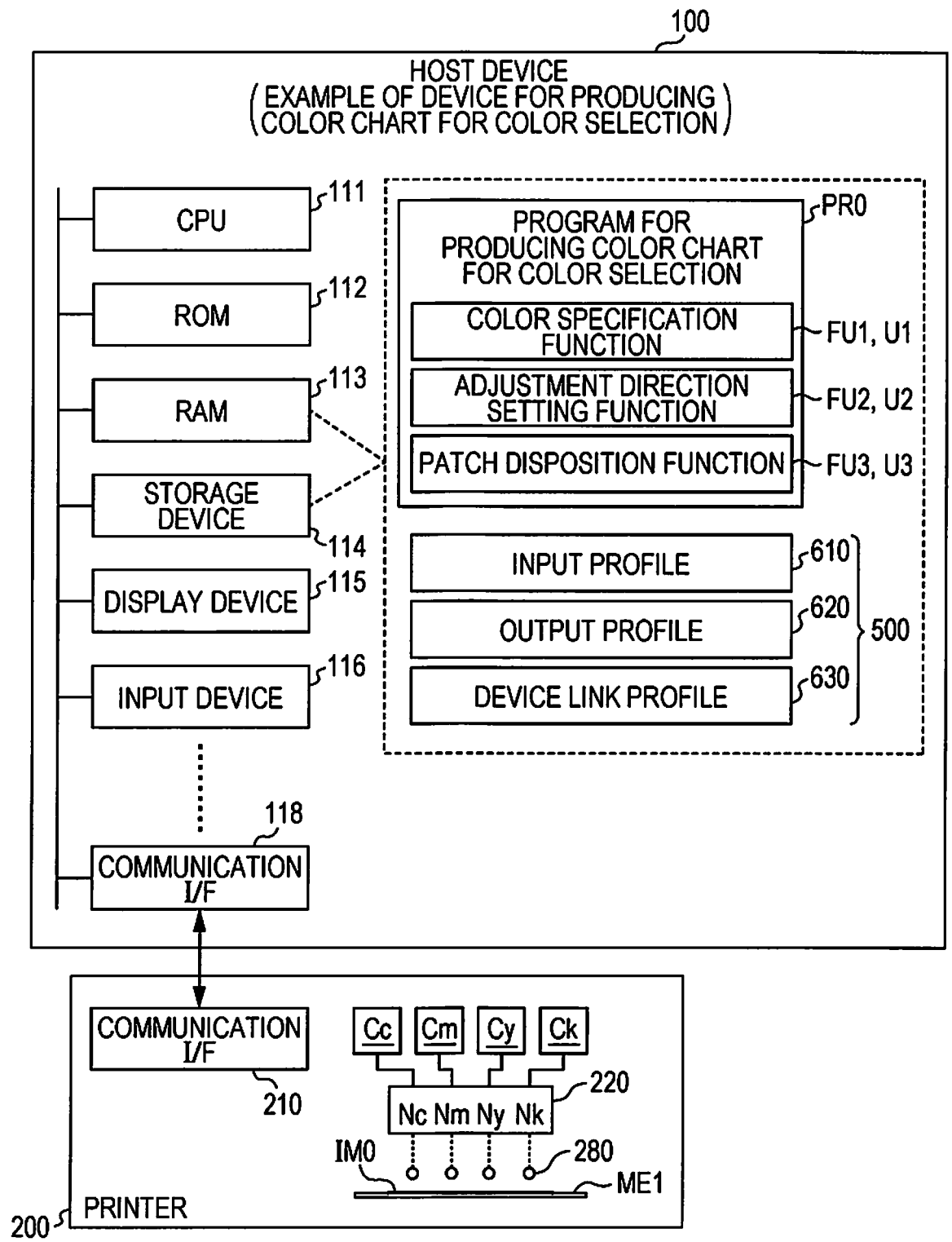
FIG. 1 is a block diagram schematically illustrating a configuration example of a device for producing a color chart for color selection.

The embodiments of the invention will be described below. It is obvious that the following embodiments merely exemplify the present invention, and not all of the features indicated in the embodiments are necessarily essential to the solving means of the invention.

(1) Technical Summary of the Invention

First, a technical summary of the invention will be explained with reference to examples indicated in FIGS. 1 to 22. Note that, the diagrams of the present application are diagrams that schematically indicate the examples, magnification ratios may be different in each direction that is indicated in the diagrams, and each diagram may not be consistent. It is obvious that each component of the present technology is not limited to the specific examples that are indicated using reference numerals.

[Aspect 1]

Figure 4:
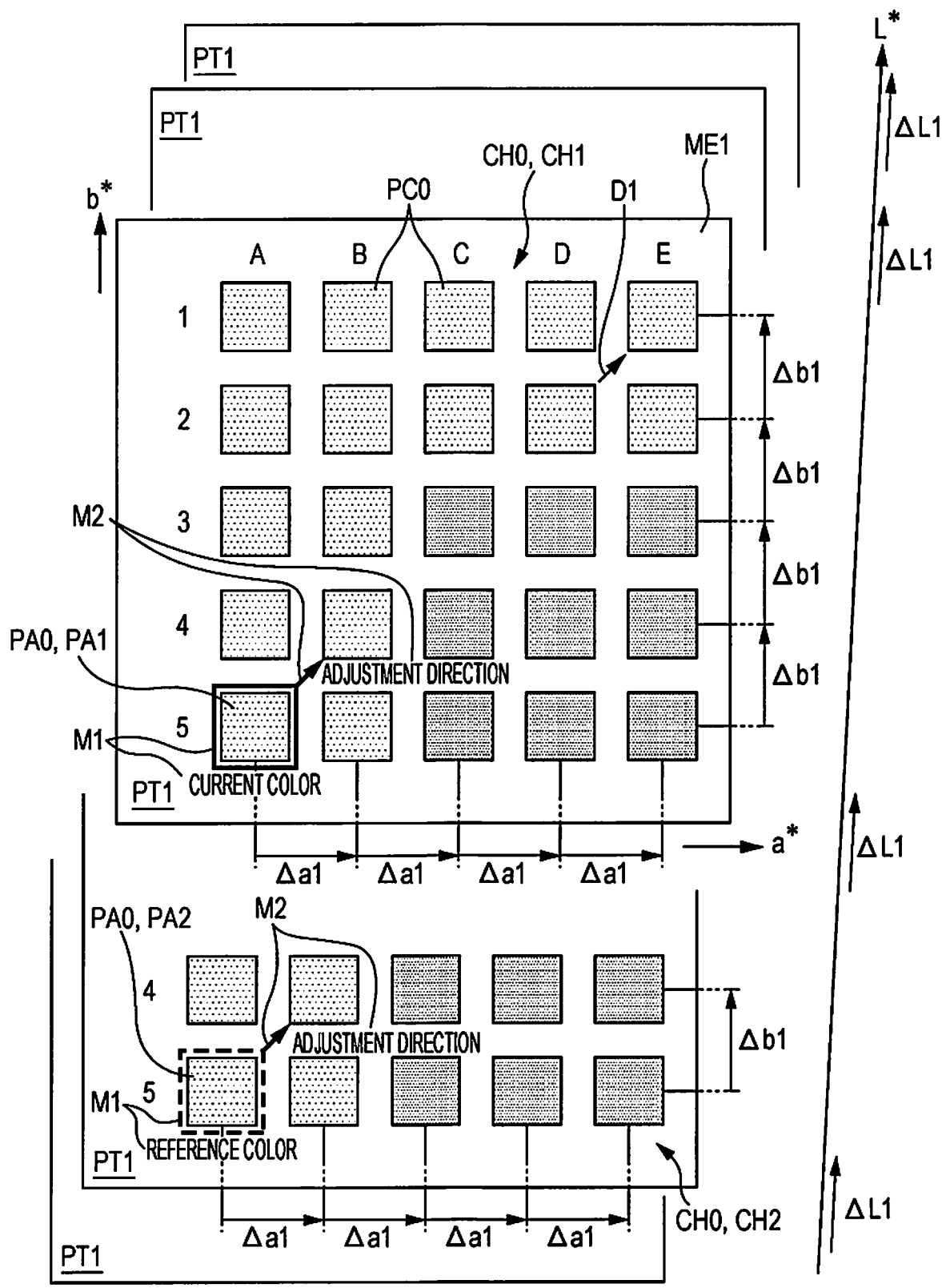
FIG. 4 is a block diagram schematically illustrating a printing material of a color chart for color selection.

As exemplified in FIG. 4 and the like, in a color chart for color selection CH0 to select a color patch of the closest color to a target color from among a plurality of the color patches PC0, the adjustment direction D1 from a target patch PA0 is wider than the counter adjustment direction D2 that is counter to the adjustment direction D1 from the target patch PA0. In this arrangement, the target patch PA0 is a color patch PC0 that represents either color of a color of the adjustment target (for example, initial color CL1) and a reference color CL2 that substitutes the color of the adjustment target (CL1). The adjustment direction D1 is a direction that represents a direction in which the color is to be adjusted from the target patch PA0 in the color chart for color selection CH0.

The color patch PC0, which is from the target patch PA0 to the counter adjustment direction D2 side, has a low likelihood of being selected. The color patch PC0, which is from the target patch PA0 to the adjustment direction D1 side, has a high likelihood of being selected. Therefore, in the color chart for color selection CH0, there are more color patches PC0 that have a high likelihood to be selected than color patches PC0 that have a low likelihood to be selected. Accordingly, the present aspect is able to provide a color chart for color selection that makes it possible to more easily search a target color patch.

Figure 22:
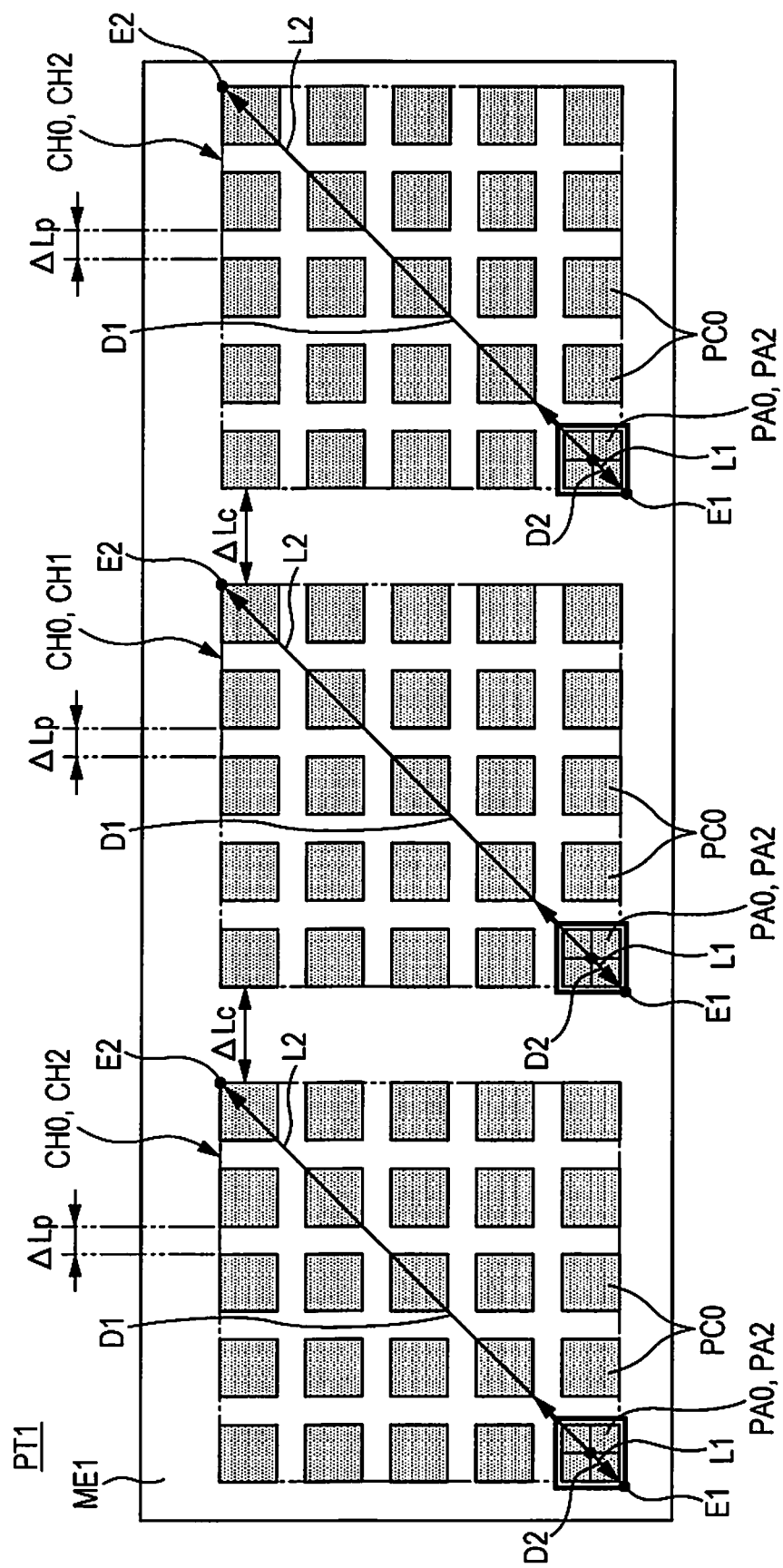
FIG. 22 is a diagram schematically illustrating an example of a printing material that has a plurality of the color charts for color selection.

Note that, it is also possible to form a plurality of the color charts for color selection CH0 as exemplified in FIG. 22 on one sheet of a material to be printed (print substrate) ME1. In a case where a color patch group is disposed with a wider gap ΔLc than a gap ΔLp between color patches of each color patch group, each patch group separated by the gap ΔLc is the color chart for color selection CH0 of the present technology.

[Aspect 2]

Information M1 that indicates the target patch PA0 may be represented in the color chart for color selection CH0 by a different color from the target patch PA0. In this configuration, it is possible to make the target patch easy to understand since the information M1 that indicates the target patch PA0 stands out.

[Aspect 3]

As exemplified in FIGS. 15A to 15D, 16A to 16D, and the like, as information M1 that indicates the target patch PA0, one or more sets of information that is selected from a frame that surrounds the target patch PA0, a character string that is attached to the target patch PA0, a mark that is attached to the target patch PA0, and an arrow that points to the target patch PA0 may be represented in the color chart for color selection CH0. In this configuration, it is possible to make the target patch easy to understand since it is easy to understand that the target patch PA0 is indicated.

Note that, although not included in aspects 2 and 3, a case where the target patch is determined and a case where there is no information that indicates the target patch are both included in the present technology.

[Aspect 4]

As exemplified in FIGS. 17A to 17D and the like, as information M2 that indicates the adjustment direction D1, one or more sets of information that is selected from an arrow, a line, and a character string may be represented in the color chart for color selection CH0. In this configuration, it is possible to make the adjustment direction easy to understand since it is easy to understand that the adjustment direction D1 is indicated.

[Aspect 5]

Figure 17A:
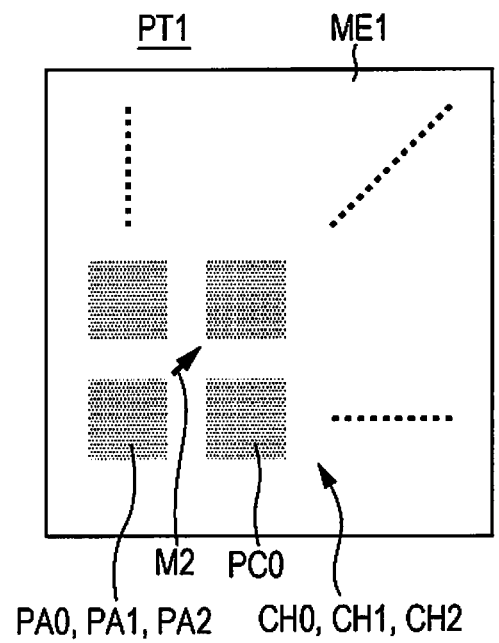
FIGS. 17A to 17D are diagrams schematically illustrating various examples of information that indicates an adjustment direction.
Figure 17B:
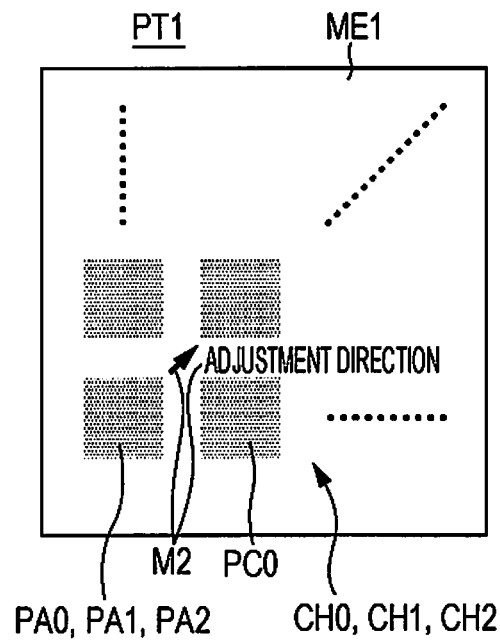
Figure 17C:
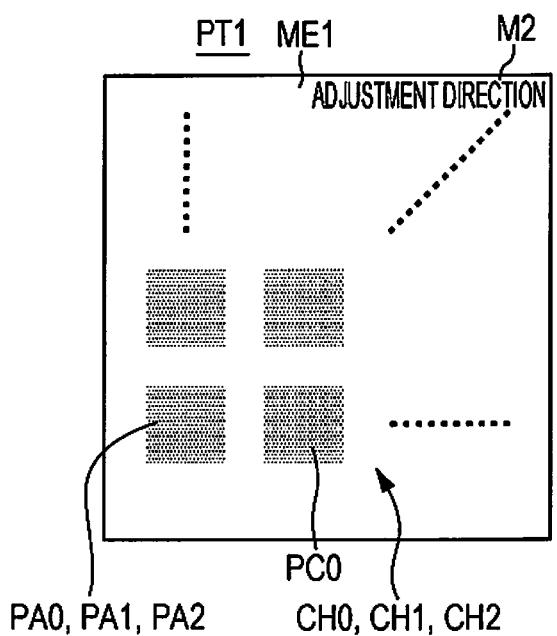
Figure 17D:
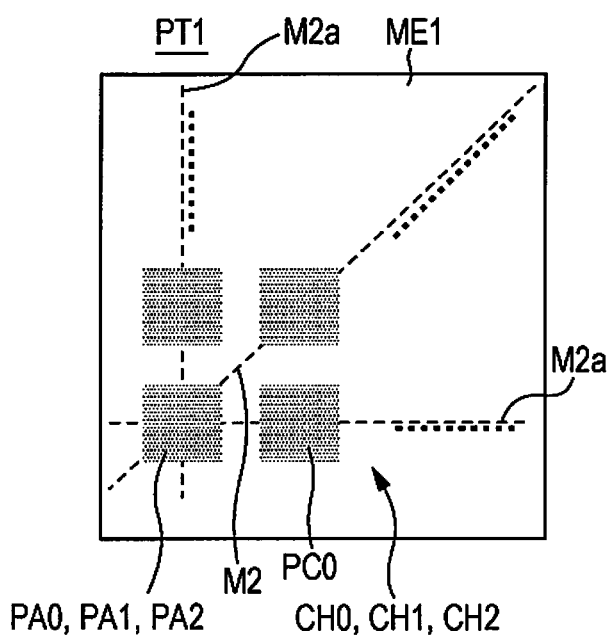

As exemplified in FIG. 17D and the like, as information M2 that indicates the adjustment direction D1, furthermore, a line M2a that represents an axial direction of a color space (for example, Lab color space) may be represented in the color chart for color selection CH0. In this configuration, it is possible to make the adjustment direction further easy to understand since it is further easy to understand that the adjustment direction D1 is indicated.

Note that, although not included in aspects 4 and 5, a case where the adjustment direction is determined and a case where there is no information that indicates the adjustment direction are both included in the present technology.

[Aspect 6]

Figure 5:
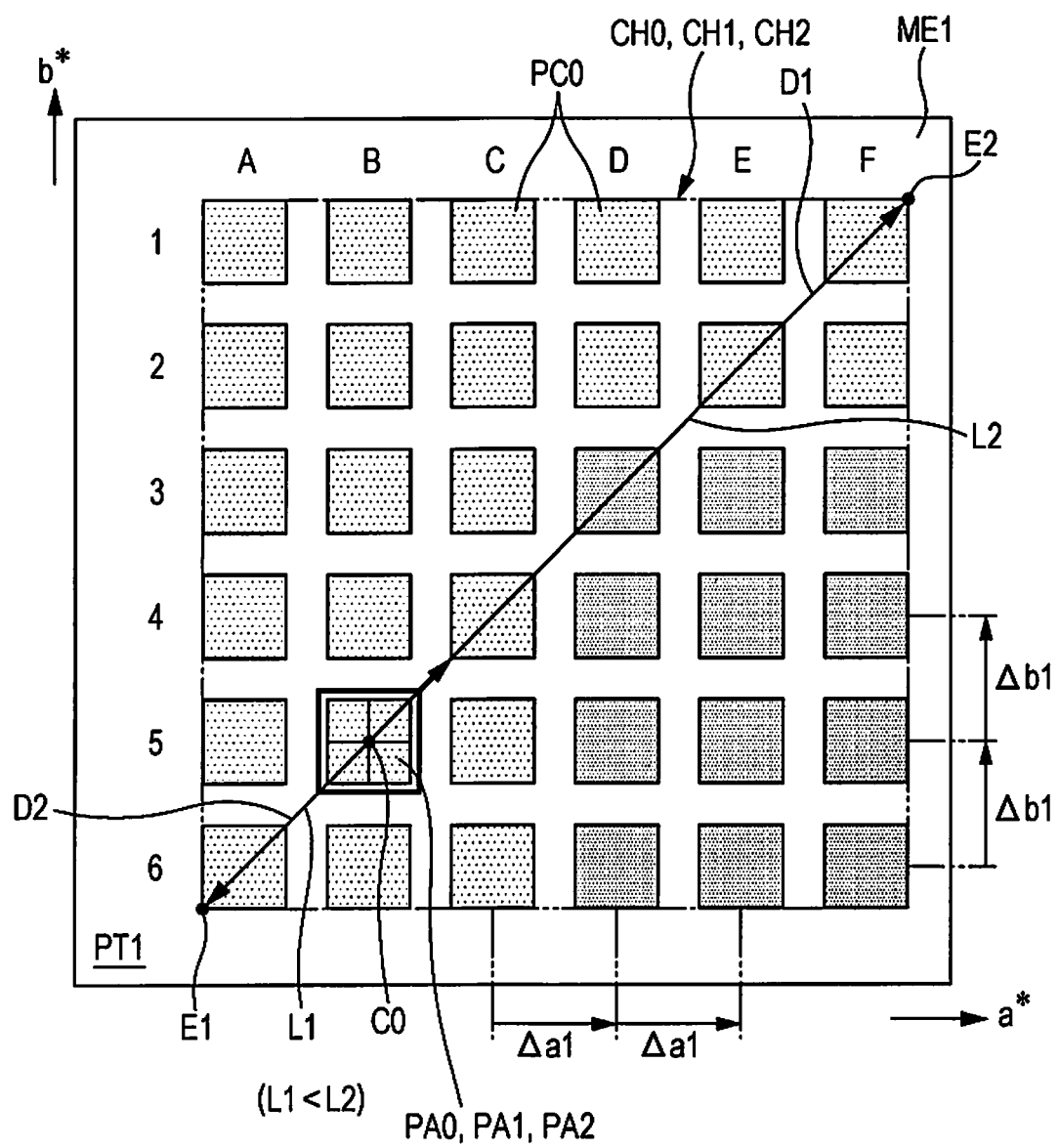
FIG. 5 is a diagram schematically illustrating an example of a color chart for color selection in which an adjustment direction from a target patch is wider than a counter adjustment direction from the target patch.
Figure 6:
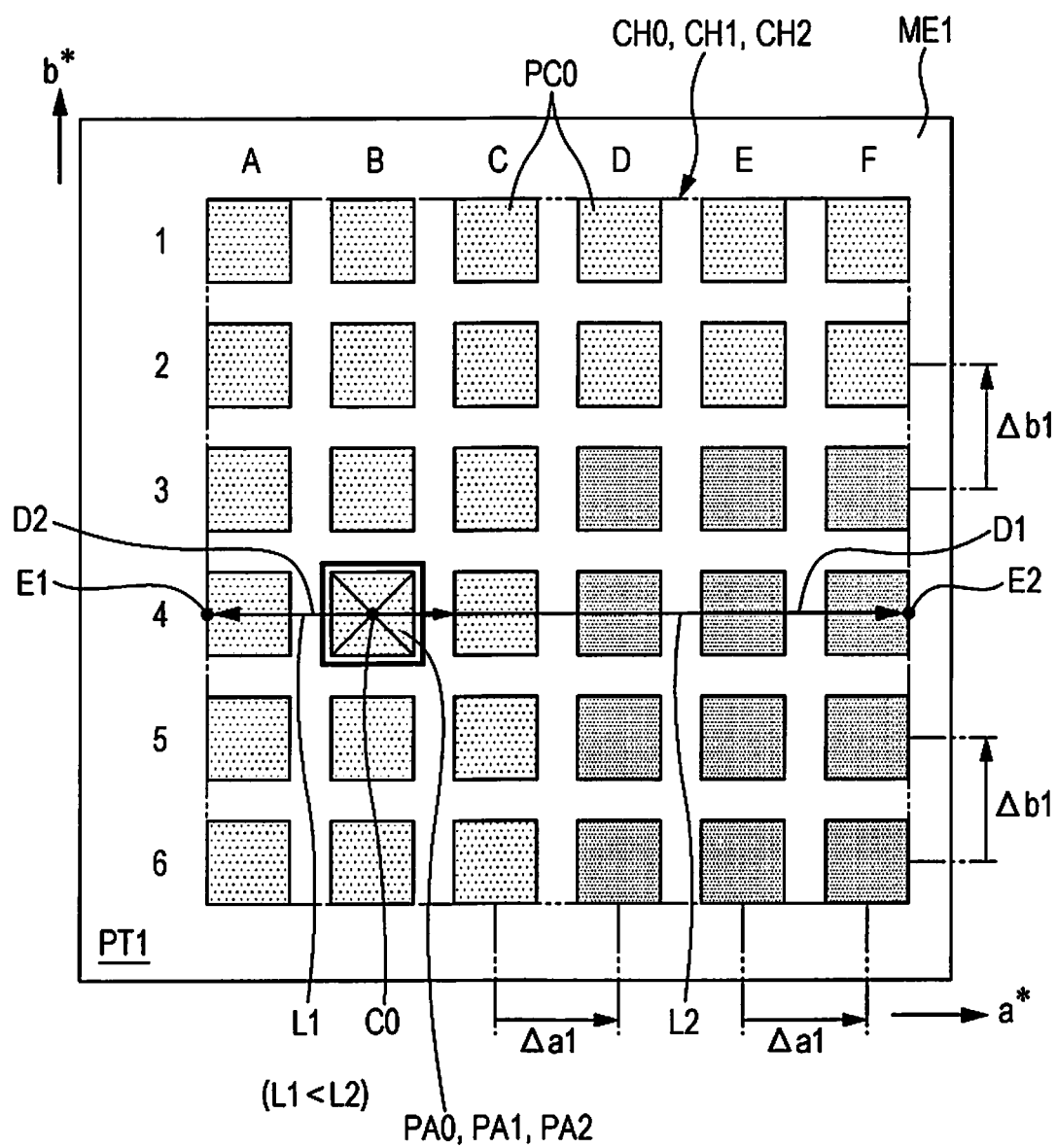
FIG. 6 is a diagram schematically illustrating an example of a color chart for color selection in which the adjustment direction from the target patch is wider than the counter adjustment direction from the target patch.

As exemplified in FIGS. 5 and 6, when a distance from the target patch PA0 up to an end E1 of the color chart for color selection CH0 in a counter adjustment direction D2 that is counter to the adjustment direction D1 is L1 and a distance from the target patch PA0 up to an end E2 of the color chart for color selection CH0 in the adjustment direction D1 is L2, {L1/(L1+L2)} may be 0.4 or less. Thereby, it is possible to more easily search a target color patch.

[Aspect 7]

Figure 7:
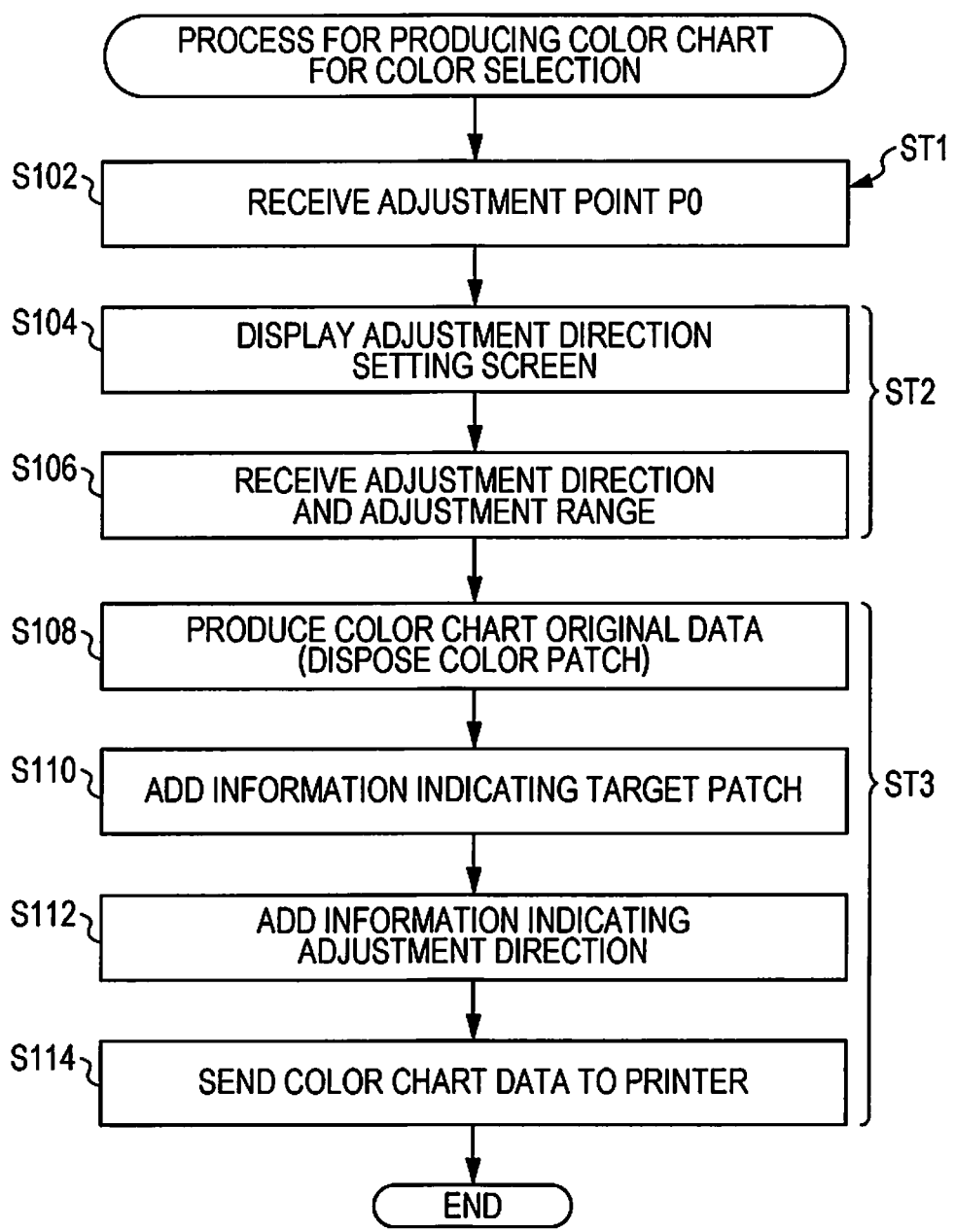
FIG. 7 is a flow chart illustrating an example of a process for producing a color chart for color selection.

Note that, as exemplified in FIGS. 1, 4, 7, and the like, there is a method for producing the color chart for color selection according to an aspect of the present technique produces the color chart for color selection CH0 in order to select a color patch of the closest color to the target color from among a plurality of the color patches PC0 wherein the method includes a color specification step ST1, an adjustment direction setting step ST2, and a patch disposition step ST3. In the color specification step ST1, color (for example, initial color CL1) specifications of the adjustment target are received. In the adjustment direction setting step ST2, settings in the adjustment direction D1 in which the color (CL1) of the adjustment target is adjusted in a predetermined color space (for example, Lab color space) are received. In the patch disposition step ST3, the color patch PC0 is disposed in the color chart for color selection CH0 by including the target patch PA0 such that the adjustment direction D1 from the target patch PA0 is wider than the counter adjustment direction D2 that is counter to the adjustment direction D1 from the target patch PA0 that represents either the adjustment target color (CL1) or a reference color (CL2) that substitutes the color (CL1) of the adjustment target.

In the color chart for color selection CH0 that includes the target patch PA0, the color patch PC0, which is from the target patch PA0 to the counter adjustment direction D2 side, has a low likelihood of being selected. The color patch PC0, which is from the target patch PA0 to the adjustment direction D1 side, has a high likelihood of being selected. Therefore, in the color chart for color selection CH0 that is obtained by the method for producing the color chart for color selection, there are more color patches PC0 that have a high likelihood to be selected than color patches PC0 that have a low likelihood to be selected. Accordingly, the present aspect is able to provide a method for producing the color chart for color selection that makes it possible to more easily search a target color patch.

In this arrangement, the color space includes a CIE Lab color space, a CIE XYZ color space, a CMYK color space, a CMY color space, an RGB color space, and the like. Note that, R signifies red, G signifies green, and B signifies blue.

Note that, the additional remarks are the same as the following aspects.

[Aspect 8]

As exemplified in FIG. 4 and the like, the target patch PA0 may include an adjustment target color patch PA1 that represents a color (CL1) of the adjustment target and a reference color patch PA2 that represents the reference color CL2. The color chart for color selection CH0 may include a first color chart CH1 that includes the adjustment target color patch PA1 and a second color chart CH2 that includes the reference color patch PA2. In the adjustment direction setting step ST2, the reference color CL2 may be determined based on the color (CL1) of the adjustment target. In the patch disposition step ST3, the color patch PC0 may be disposed in the first color chart CH1 by including the adjustment target color patch PA1 such that the adjustment direction D1 from the adjustment target color patch PA1 is wider than the counter adjustment direction D2 that is counter to the adjustment direction D1 from the adjustment target color patch PA1. In addition, in the adjustment direction setting step ST2, the color patch PC0 may be disposed in the second color chart CH2 by including the reference color patch PA2 such that the adjustment direction D1 from the reference color patch PA2 is wider than the counter adjustment direction D2 that is counter to the adjustment direction D1 from the reference color patch PA2.

In this configuration, it is possible to more easily search the target color patch since the color chart for color selection CH0 includes the first color chart CH1 and the second color chart CH2.

[Aspect 9]

Figure 13:
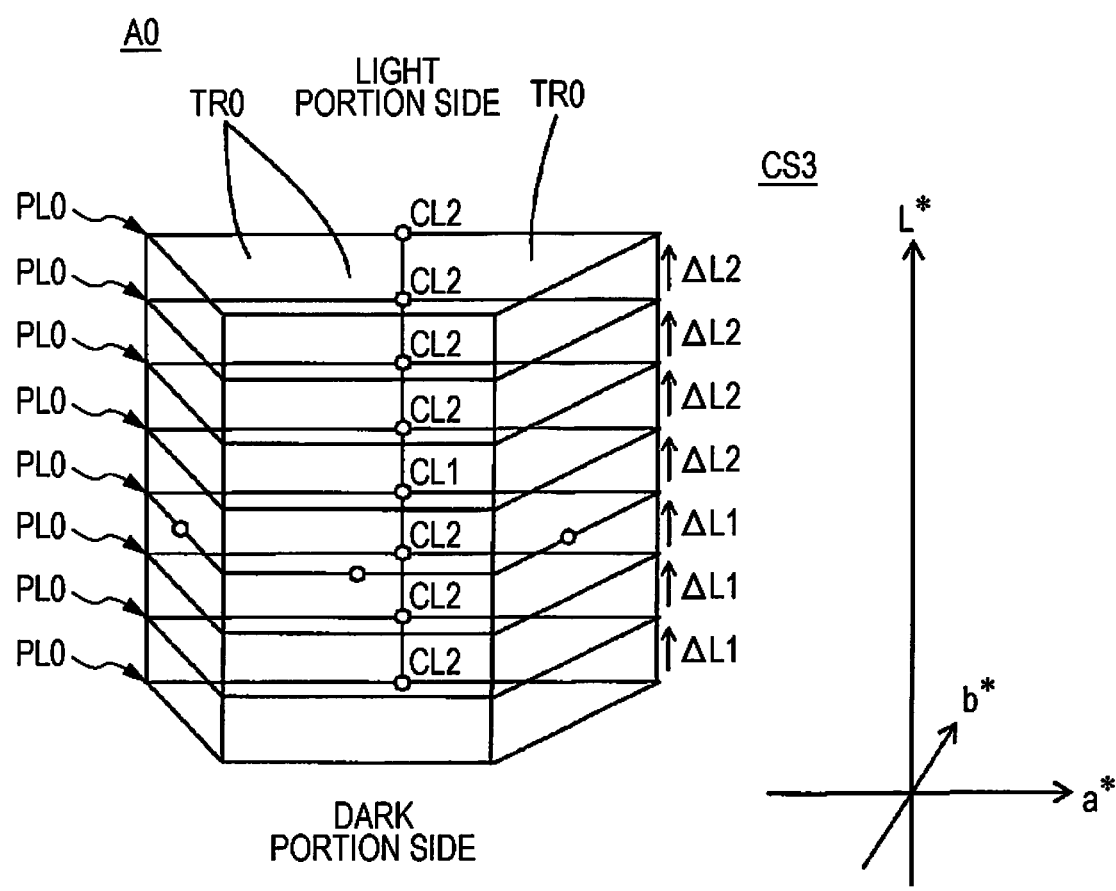
FIG. 13 is a diagram schematically illustrating an example of setting a virtual plane in the color patch usable region in a lightness axial direction.

As exemplified in FIG. 13, and the like, in the patch disposition step ST3, the reference color CL2 may be determined as a color that is shifted in an axial direction (for example, L-axis direction) of the color space from the color (CL1) of the adjustment target in the color space. In this configuration, it is possible to provide a suitable method for producing the color chart for color selection that makes it possible to more easily search a target color patch.

In this arrangement, a plurality of axes of the color space are determined according to the color space. For example, the Lab color space has an L-axis, an a-axis, and a-b axis. In this case, the reference color may be shifted in the L-axis direction from the color of the adjustment target, may be shifted in the a-axis direction from the color of the adjustment target, and may be shifted in the b-axis direction from the color of the adjustment target.

Note that, the additional remarks are the same as the following aspects.

[Aspect 10]

Figure 9:
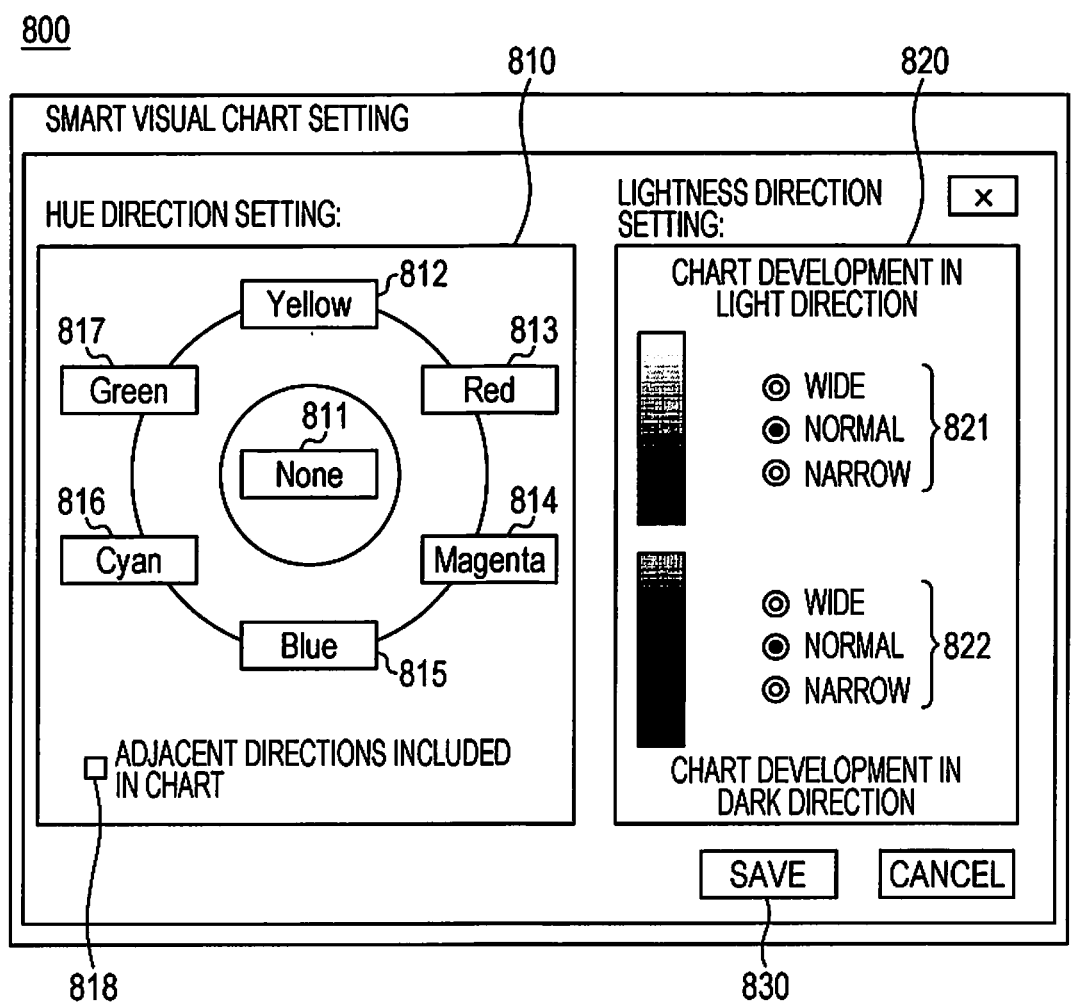
FIG. 9 is a diagram schematically illustrating an example of an adjustment direction settings screen.
Figure 10:
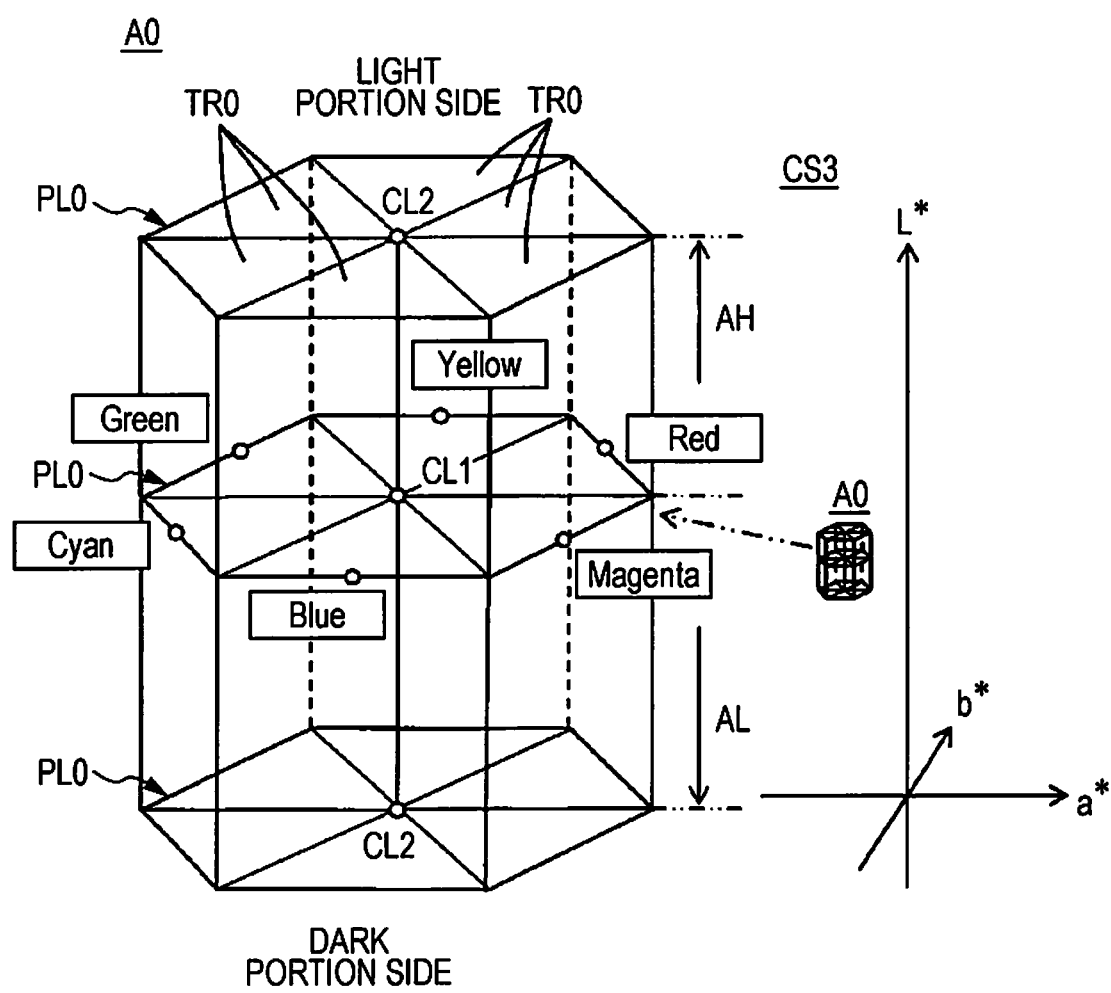
FIG. 10 is a diagram schematically illustrating an example of a color patch usable region that is set in a color space.

As exemplified in FIG. 10 and the like, in the patch disposition step ST3, the color of the color patch PC0 that is disposed in the first color chart CH1 may be a color of a virtual plane PL0 along the first axis (for example, a-axis) and the second axis (for example, b-axis) that are included in the plurality of axes (for example, L-axis, a-axis, and b-axis) in the color space. As exemplified in FIG. 9 and the like, in the adjustment direction setting step ST2, setting of the adjustment direction D1 is received so as to be a direction along the virtual plane PL0. In this configuration, it is possible to easily set the adjustment direction D1 since it is possible to set the adjustment direction D1 along the virtual plane PL0 along the first axis and the second axis in the color space.

[Aspect 11]

As exemplified in FIG. 9 and the like, in the adjustment direction setting step ST2, one or more directions of one portion from among three or more directions (in FIG. 9, six directions) along the virtual plane PL0 may be received as the direction that corresponds to the adjustment direction D1. In this configuration, it is possible to more easily set the adjustment direction.

[Aspect 12]

As exemplified in FIG. 13 and the like, in the adjustment direction setting step ST2, the reference color CL2 may be determined as a color that is shifted along a third axis (for example, L-axis) from the color (CL1) of the adjustment target in the color space. In this configuration, it is possible to provide a suitable method for producing the color chart for color selection that makes it easy to search a target color patch.

[Aspect 13]

As exemplified in FIG. 9 and the like, in the adjustment direction setting step ST2, specification of a range in which the reference color CL2 shifts from the color (CL1) of the adjustment target along the third axis may be received, and the reference color CL2 may be determined based on the range. In this configuration, it is possible to provide a method for producing the color chart for color selection that makes it easier to search a target color patch.

[Aspect 14]

Figure 21:
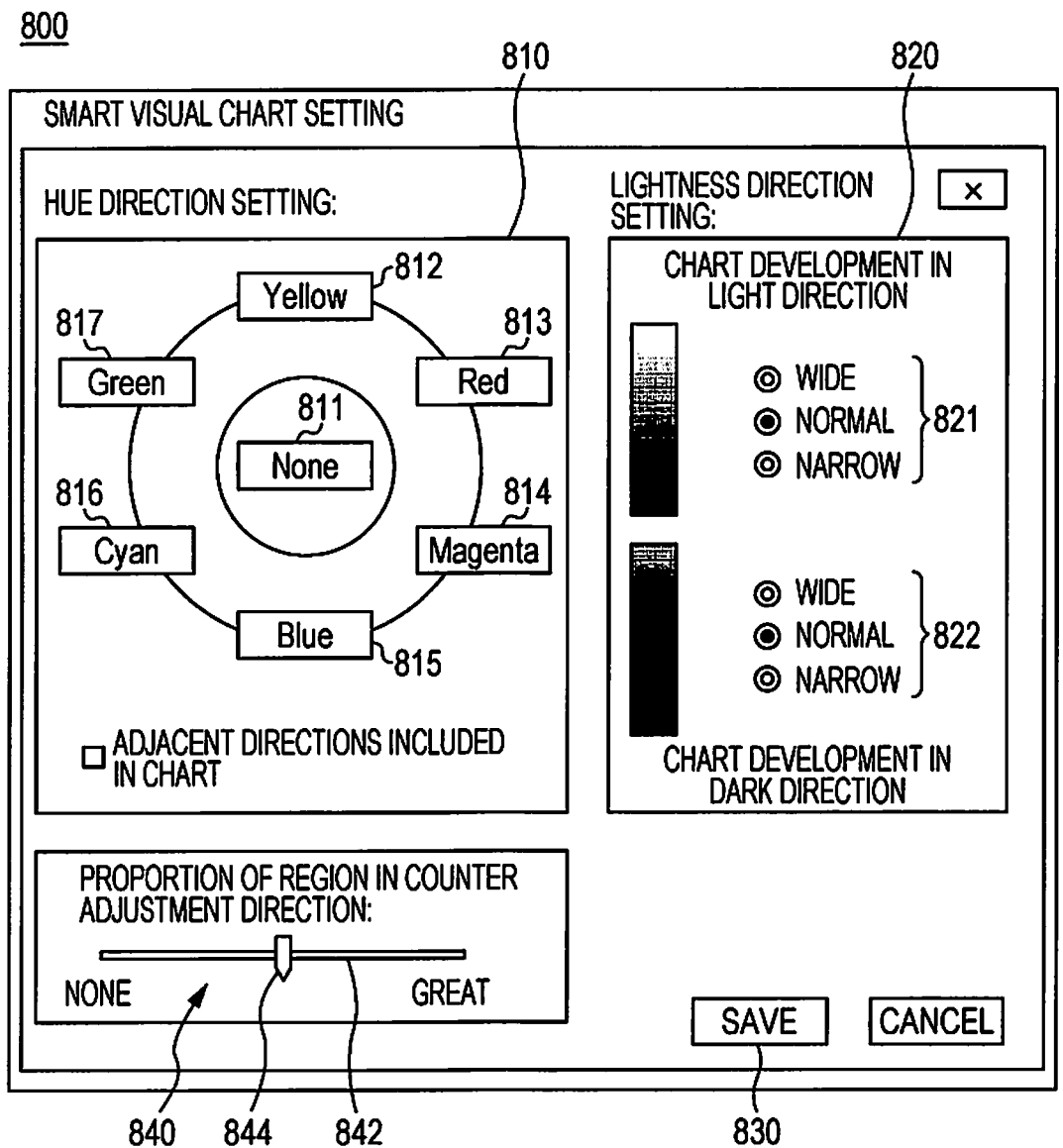
FIG. 21 is a diagram schematically illustrating another example of a user interface screen.

As exemplified in FIG. 21 and the like, in the adjustment direction setting step ST2, specification may be received of a degree of a distance from the target patch PA0 up to an end E1 of the color chart for color selection CH0 in the counter adjustment direction D2 counter to the adjustment direction D1. In the patch disposition step ST3, the target patch PA0 may be disposed at a position based on the degree of the distance in the color chart for color selection CH0. In this configuration, it is possible to provide a suitable method for producing the color chart for color selection that makes it easier to search a target color patch.

[Aspect 15]

Note that, a program PR0 for generating the color chart for color selection according to one aspect of the present technique realizes in a computer a color specification function FU1 that corresponds to the color specification step ST1, an adjustment direction setting function FU2 that corresponds to the adjustment direction setting step ST2, and a patch disposition function FU3 that corresponds to the patch disposition step ST3. The present aspect is able to provide a program for producing the color chart for color selection that makes it easier to search a target color patch.

[Aspect 16]

In addition, a device (for example, a host device 100) for generating the color chart for color selection according to one aspect of the present technique includes a color specification portion U1 that corresponds to the color specification step ST1, an adjustment direction setting portion U2 that corresponds to the adjustment direction setting step ST2, and a patch disposition portion U3 that corresponds to the patch disposition step ST3. The present aspect is able to provide a device for producing the color chart for color selection that makes it easier to search a target color patch.

Furthermore, it is possible to apply the present technique to a method for controlling the device for producing the color chart for color selection, a composite system that includes the device for producing the color chart for color selection, a method for controlling the composite system, a computer-readable medium having recorded thereon, a program for controlling the device, a program for producing the color chart for color selection, a program for controlling the composite system, a program for generating the color chart for color selection, or the control program, and the like. The device described above may be configured by a plurality of dispersed parts.

(2) Specific Example of Configuration of Device for Producing Color Chart for Color Selection FIG. 1 schematically illustrates a host device 100 as a configuration example of a device for producing a color chart for color selection. The host device 100 is connected to and is able to input and output information to and from each of a central processing unit (CPU) 111, a read only memory (ROM) 112, a random access memory (RAM) 113, a storage device 114, a display device 115, an input device 116, a communication interface (I/F) 118, and the like.

The storage device 114 stores an operating system (OS) which is not shown in the drawings, the program PR0 for generating the color chart for color selection, and the like. As appropriate, such software is read to the RAM 113 and is used in a process for generating the color chart for color selection. At least one of the RAM 113 and the storage device 114 stores various information, for example, an input profile 610, an output profile 620, a device link profile 630, and the like. In this arrangement, the profiles 610-630 are collectively referred to as a profile 500. It is possible to use a non-volatile semiconductor memory such as a flash memory, a magnetic storage device such as a hard disk, and the like as the storage device 114.

It is possible to use a liquid crystal display panel and the like as the display device 115. It is possible to use a pointing device, a hard key including a keyboard, a touch panel stuck on the surface of the display panel, and the like as the input device 116. The communication I/F 118 is connected to a communication I/F 210 of a printer 200, and inputs and outputs information such as printing data with respect to the printer 200. It is possible to use a universal serial bus (USB), a near-field communication standard, and the like as a standard for the communication I/F 118 and 210. Communication with the communication I/F 118 and 210 may be wired, may be wireless, and may be network communication such as a local area network (LAN) or the Internet.

The program PR0 for generating the color chart for color selection indicated in FIG. 1 realizes in the host device 100 the color specification function FU1, the adjustment direction setting function FU2, and the patch disposition function FU3.

Note that, a computer and the like such as a personal computer (including a tablet-type terminal) are included as the host device 100. The host device 100 may have all constituent elements 111-118 in one casing, but may be configured by a plurality of devices that are divided so as to be able to communicate with each other. In addition, even if the printer is in the host device 100 the present technology is able to be implemented.

The printer 200 that is indicated in FIG. 1 is an ink jet printer that discharges (ejects), as color materials, cyan (C) ink, magenta (M) ink, yellow (Y) ink, and black (K) ink from the recording head 220 and forms an output image IMO that corresponds to the printing data. The recording head 220 supplies ink of cyan, magenta, yellow, and black (CMYK) respectively from ink cartridges Cc, Cm, Cy, and Ck, and discharges ink droplets 280 of CMYK respectively from nozzles Nc, Nm, Ny, and Nk. When the ink droplets 280 are landed on a material to be printed ME1, ink dots are formed on the material to be printed ME1. As a result, a printing material is obtained having the output image IMO on the material to be printed ME1.

(3) Specific Example of Color Management System

Next, referring to FIG. 2, an example of a color management system to which the present technology is applicable will be described. Note that, in the embodiments that will be described below, in a case where a second color space CS2 (refer to FIG. 3) dependent on the ink jet printer 200 is a CMYK color space, the second color space CS2 represents a cmyk color space in order to distinguish from the CMYK color space of the first color space CS1 (refer to FIG. 3) that is dependent on a target printing machine 300.

Figure 2:
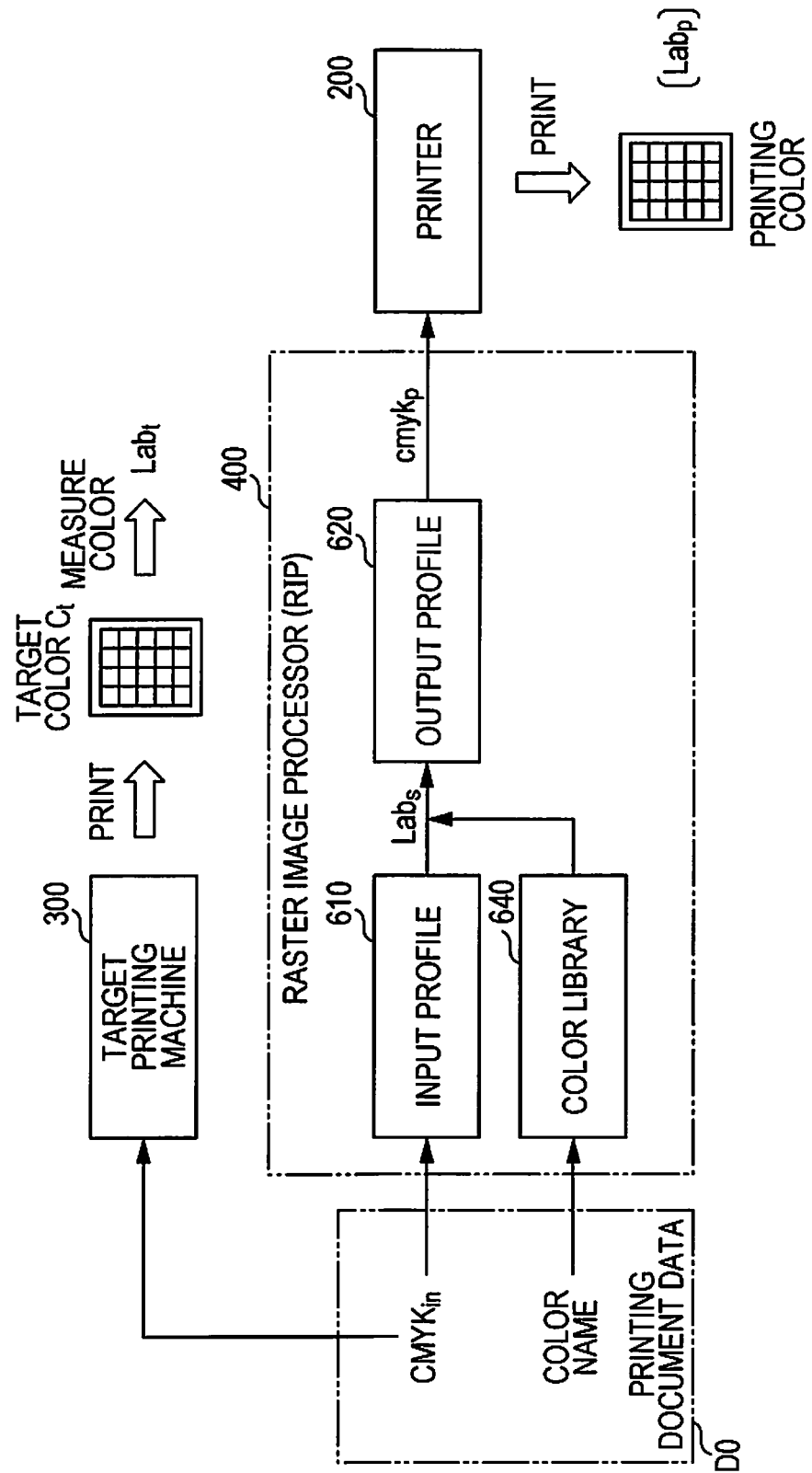
FIG. 2 is a diagram schematically illustrating an example of a color management flow.

The color management system indicated in FIG. 2 converts printing original data D0 to output data that represents a printing color $cmyk_p$ (cyan, magenta, yellow, and black) using a raster image processor (RIP) 400 and forms a printing material on the ink jet printer 200. The printing original data D0 represents process colors $CMYK_{in}$ for reproducing a color (target color $C_t$) that targets CMYK ink (color material) of the target printing machine 300 which is an example of a color matching target device. The color name in the color library is able to be specified in the printing original data D0. For example, a Pantone (registered trademark) color library and the like is usable as the color library.

The target printing machine 300 is an offset printing machine, but may be a gravure printing machine, a flexoprinting machine, and the like. For example, the target color $C_t$ is represented by the coordinate value (Lab value) of the CIE Lab color space. FIG. 2 indicates a circumstance for printing a color chart that represents the target color Ct on the material to be printed using the target printing machine 300, and measuring the color of each patch of the color chart using a color measuring device and acquiring a colorimetric value $Lab_t$. The process color $CMYK_{in}$ corresponds to a usage amount of CMYK ink that is used by the target printing machine 300, and represents coordinates of the CMYK color space that is dependent on the target printing machine 300.

The RIP 400 has the input profile 610, the output profile 620, and the color library 640. The input profile 610 is a file that describes a color characteristic of ink that is used by the target printing machine 300. The output profile 620 is a file that describes a color characteristic of ink that is used by the ink jet printer 200. For example, both profiles 610 and 620 are able to use the ICC profile data format. The process colors $CMYK_{in}$ of the printing original data D0 are converted to a Lab color space color $Lab_s$ in accordance with the input profile 610, and is converted to a printing color $cmyk_p$ in accordance with the output profile 620. In a case where the printer 200 uses a total of four colors of ink of CMYK, the printing color $cmyk_p$ is output to the printer 200 and reproduced on the printing material. FIG. 2 indicates a circumstance in which a color chart that represents the printing color $cmyk_p$ is printed on the material to be printed by the printer 200. It is possible to acquire a colorimetric value $Lab_p$ by measuring the color of each patch of the color chart using the color measuring device if there is a color measuring device, but there are users who do not own a color measuring device. In a case where the printer 200 uses inks of light cyan (Lc), light magenta (Lm), dark yellow (Dy), light black (Lk), and the like, it is possible for the printer 200 to reproduce the printing color $cmyk_p$ on the printing material when the RIP 400 or the printer 200 separate the printing color $cmyk_p$ into dark and light. It is obvious that the printing color itself is not limited to the four colors of CMYK.

In addition, in a case where the color name is set in the printing original data D0, the RIP 400 may convert color name to the Lab color space color $Lab_s$ with reference to the color library 640.

Note that, the RIP 400 has an input profile for converting the coordinate values of the Lab color space to a color other than the process color $CMYK_{in}$ such as a process color $(CMY_{in})$ that represents the usage amount of the color material of only three primary colors CMY that is a subtractive color mixture or a process color $(RGB_{in})$ that represents the intensity of the three primary colors red (R), green (G), and blue (B) that is an additive color mixture. Accordingly, the RIP 400 is able to convert the process color $CMY_{in}$, the process color $RGB_{in}$, and the like to the printing colors $cmyk_p$ via the Lab color space. Additionally, the RIP 400 is also able to convert to the printing colors $cmyk_p$ by inputting the color $Lab_s$ of the Lab color space.

As described above, it is possible to reproduce a color close to a color of the target printing machine 300 using the ink jet printer 200. However, in practice, there are cases where it is not possible to reproduce an anticipated color due to a profile error, a color measurement error, variation of a printer, or the like. In this case, conversion precision of a target color is improved by correcting the profiles 610 and 620. In this arrangement, it is necessary for a user who does not own a color measuring device to print the color chart for color selection in the printer 200 and to select a color patch of the color chart for color selection by visual inspection.

Figure 3:
FIG. 3 is a diagram schematically illustrating an example of a relationship of various profiles.

Note that, as exemplified in FIG. 3, the profile 500 is data that specifies a correspondence relationship between coordinate values of an input color space CS4 and coordinate values of an output color space CS5. The input profile 610 is data that specifies a correspondence relationship between the CMYK value ($C_i$, $M_i$, $Y_i$, and $K_i$) of the CMYK color space (for example, first color space CS1) that matches the ink used by the target printing machine 300 and the Lab value ($L_i$, $a_i$, and $b_i$) of the Lab color space (for example, profile connection space (PCS) CS3). A lattice point GD1 of an A2B table in such a case is normally lined up such that there are approximately equal gaps in the CMYK color space in a C-axis direction, an M-axis direction, a Y-axis direction, and a K-axis direction. Note that, in this instance, a variable i is a variable that identifies the lattice point GD1 that is set in the CMYK color space (CS1).

The output profile 620 is data that specifies a correspondence relationship between a Lab value ($L_j$, $a_j$, and $b_j$) of the Lab color space (CS3) and the cmyk value ($c_j$, $m_j$, $y_j$, $k_j$) of the cmyk color space (for example, second color space CS2) that matches the ink used in the ink jet printer 200. A lattice point GD2 of a B2A table in such a case is ordinarily lined up such that there are approximately equal gaps in the Lab color space in an L-axis direction, an a-axis direction, and a b-axis direction. Note that, here, a variable j is a variable that identifies the lattice point GD2 that is set in the Lab color space (CS3). The reason for the expression of "cmyk color space" is to distinguish the color space matching the ink used by the printer 200 from the color space matching the target printing machine 300.

The device link profile 630 is data that specifies a correspondence relationship between the CMYK value ($C_i$, $Y_i$, and $K_i$) of the CMYK color space (CS1) and the cmyk value ($c_i$, $m_i$, $y_i$, and $k_i$) of the cmyk color space (CS2). In this instance, a variable i is a variable that identifies the lattice point GD1 that is set in the CMYK color space (CS1). The device link profile 630 is obtained by combining the input profile 610 and the output profile 620.

Note that, the lattice point (grid point) signifies a point of a virtual line that is disposed in the input color space, and output coordinate values that correspond to the position of the lattice point in the input color space is assumed to be stored in the lattice point. The present technology includes cases where not only are a plurality of lattice points disposed equally in the input color space, but also cases where the plurality of lattice points are disposed unequally in the input color space.

(4) Specific Example of Color Chart for Color Selection

FIG. 4 schematically illustrates the printing material PT1 (hereinafter, simply described as "color chart CH0") of the color chart for color selection CH0 for selecting the color patch closest to the target color from among a plurality of the color patches PC0 as an example of the color chart for color selection for correcting the profile 500. The patch is also referred to as a color chart. The color chart for color selection CH0 includes a first color chart CH1 that includes the adjustment target color patch PA1 that represents the initial color CL1 (example of the color of the adjustment target) and one or more second color charts CH2 that include the reference color patch PA2 that represents the reference color CL2 that substitutes the initial color CL1. In this arrangement, the adjustment target color patch PA1 and the reference color patch PA2 are collectively referred to as a target patch PA0.

In each color chart CH1 and CH2, each color patch PC0 is lined up such that the color coordinates a of the Lab color space in a lateral direction are a difference $\Delta a1$ ($\Delta a1 > 0$), and each color patch PC0 is lined up such that the color coordinates b of the Lab color space in a vertical direction are a difference $\Delta b1$ ($\Delta b1 > 0$). Accordingly, in a case where the color patch in the color chart is lined up with a certain color coordinate difference in the Lab color space, the color space of the reference in which the color patch is disposed is the Lab color space. In this arrangement, the position of the color patch PC0 in the lateral direction in each color chart CH1 and CH2 is represented by alphabet characters A, B, C, . . . , and the position of the color patch PC0 in the vertical direction in each color chart CH1 and CH2 is represented by number characters 1, 2, 3, . . . . For example, the target patch PA0 indicated in FIG. 4 is an "A5" position.

In addition, in a plurality of the color charts CH1 and CH2, a color patch PC0 is formed on the material to be printed ME1 such that the lightness L of the Lab color space at the color patch PC0 at same position becomes the difference $\Delta L1$ or $\Delta L2$ ($\Delta L1 > 0$, $\Delta L2 > 0$).

A character string such as "current color" and a solid line frame that surrounds the adjustment target color patch PA1 are attached to the adjustment target color patch PA1 of the first color chart CH1 as information M1 that indicates the target patch. The solid line frame and the character string are represented by colors different from the adjustment target color patch PA1.

In addition, a character string such as "adjustment direction" and an arrow are attached to the first color chart CH1 as information M2 that indicates the adjustment direction D1 in which the color is to be adjusted from the adjustment target color patch PA1. The adjustment direction D1 represents a direction in which the color is to be adjusted from the adjustment target color patch PA1. The arrow indicated in FIG. 4 indicates a direction from the adjustment target color patch PA1 to the upper right, and the direction is the adjustment direction D1 in which the initial color CL1 is adjusted. The arrow and the character string are represented by colors different from the neighboring color patch PC0.

A character string such as "reference color" and a solid line frame that surrounds the reference color patch PA2 are attached to the reference color patch PA2 of the second color chart CH1 as information M1 that indicates the target patch. Accordingly, the information that indicates the adjustment target color patch PA1 and the information that indicates the reference color patch PA2 are different. The solid line frame and the character string described above are represented by colors different from the reference color patch PA2.

In addition, a character string such as "adjustment direction" and an arrow are attached to the second color chart CH2 as information M2 that indicates the adjustment direction D1 in which the color is to be adjusted from the reference color patch PA2. The arrow and the character string are represented by colors different from the neighboring color patch PC0. In the example indicated in FIG. 4, the information that indicates the adjustment direction D1 from the adjustment target color patch PA1 and the information that indicates the adjustment direction D1 from the reference color patch PA2 are the same, but the information that indicates the adjustment direction D1 from the adjustment target color patch PA1 and the information that indicates the adjustment direction D1 from the reference color patch PA2 may be different.

Furthermore, in the first color chart CH1, the adjustment target color patch PA1 is an approximate end portion, and the adjustment direction D1 from the adjustment target color patch PA1 is wider than the counter adjustment direction D2 from the adjustment target color patch PA1. In the second color chart CH2, the reference color patch PA2 is an approximate end portion, and the adjustment direction D1 from the reference color patch PA2 is wider than the counter adjustment direction D2 from the reference color patch PA2. The target patch PA0 being the "approximate end portion" signifies that the other direction (adjustment direction D1) from the target patch PA0 is wider than the one direction (counter adjustment direction D2) from the target patch PA0 in the direction along the adjustment direction D1 and the counter adjustment direction D2. That is, the color chart for color selection CH0 has a feature of the adjustment direction D1 from the target patch PA0 being wider than the counter adjustment direction D2 that is counter to the adjustment direction D1 from the target patch PA0.

FIGS. 5 and 6 schematically illustrate another example in which the adjustment direction D1 from the target patch PA0 is wider than the counter adjustment direction D2 from the target patch PA0. Although repeated, the color chart for color selection CH0 is collectively referred to as the first color chart CH1 and the second color chart CH2.

The color chart CH0 that is indicated in FIG. 5 has six color patches PC0 in the lateral direction and six color patches PC0 in the vertical direction, the target patch PA0 is disposed at position B5, and the adjustment direction D1 from the target patch PA0 is a right and upward direction. In this arrangement, the distance from the center C0 of the target patch PA0 up to the end E1 of the color chart CH0 in the counter adjustment direction D2 is set as L1, and the distance from the center C0 of the target patch PA0 up to the end E2 of the color chart CH0 in the adjustment direction D1 is set as L2. The end of the color chart CH0 is positioned to link the end on the outer side in the outermost color patch in the color patch PC0 group that is lined up with equal gaps so as to be surrounded by a two-dot chain line in FIG. 5. The adjustment direction D1 from the target patch PA0 being wider than the counter adjustment direction D2 from the target patch PA0 is signified by L1<L2.

The ratio $\{L1/(L1+L2)\}$ of the distance L1 between the center C0 of the target patch PA0 and the end E1 in the counter adjustment direction D2 with respect to the length L1+L2 that links the ends E1 and E2 of the color chart CH0 is preferably 0.4 or less, more preferably is 0.3 or less, and further preferably 0.2 or less. It is also possible that {L1/(L1+L2)}≤0.1.

The color chart CH0 that is indicated in FIG. 6 has six color patches PC0 in the lateral direction and six color patches PC0 in the vertical direction, the target patch PA0 is disposed at position B4, and the adjustment direction D1 from the target patch PA0 is a rightward direction. In this arrangement, when the distance from the center C0 of the target patch PA0 up to the end E1 of the color chart CH0 in the counter adjustment direction D2 is set as L1, and the distance from the center C0 of the target patch PA0 up to the end E2 of the color chart CH0 in the adjustment direction D1 is set as L2, L1<L2. The ratio {L1/(L1+L2)} is preferably 0.4 or less, more preferably is 0.3 or less, and further preferably 0.2 or less. It is also possible that {L1/(L1+L2)}≤0.1.

(5) Specific Example of Process for Producing Color Chart for Color Selection

Figure 8A:
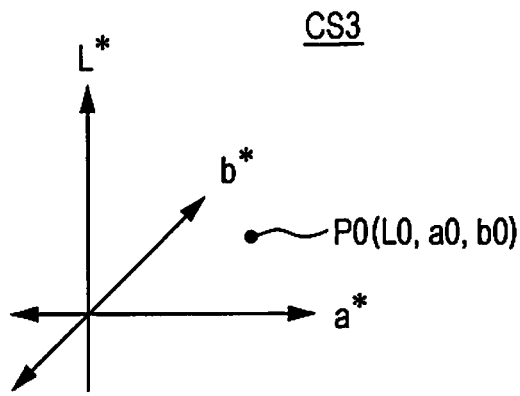
FIGS. 8A to 8C are diagrams schematically illustrating an example in which an adjustment point is set.
Figure 8B:
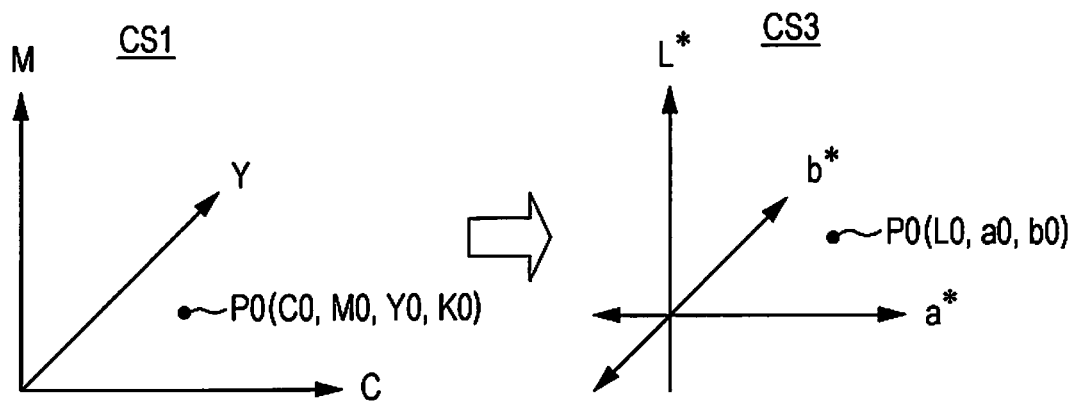
Figure 8C:
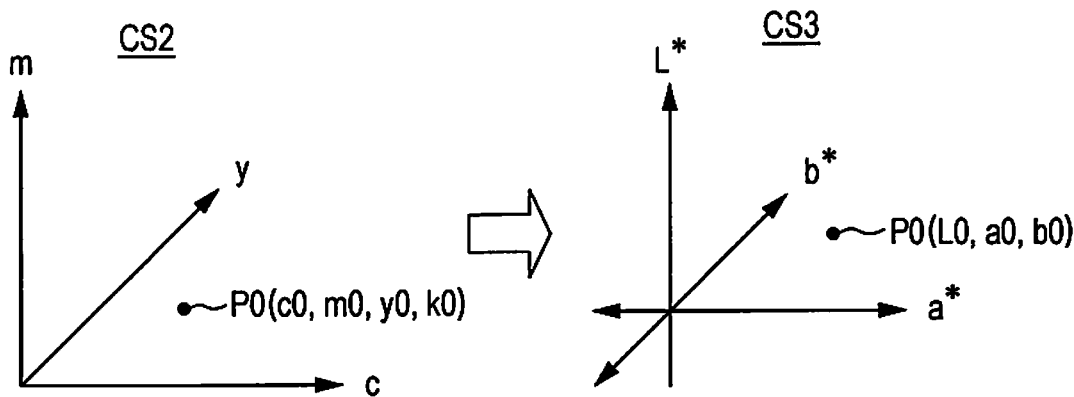

FIG. 7 indicates an example of a process for producing a color chart for color selection that is performed by the host device 100 that is indicated in FIG. 1. FIGS. 8A to 8C schematically exemplify a circumstance in which the adjustment point P0 that represents the color of the adjustment target is set. FIG. 8B indicates a three-dimensional virtual line space that forms the CMYK color space (CS1) with a C-axis, an M-axis, and a Y-axis since the CMYK color space (CS1) is a four-dimensional color space. FIG. 8C indicates a three-dimensional virtual line space that forms the cmyk color space (CS2) at a c-axis, an m-axis, and a y-axis since the cmyk color space (CS2) is a four-dimensional color space.

The host device 100 executes a plurality of processes in parallel by multitasking. In this arrangement, step S102 of FIG. 7 corresponds to the color specification step ST1, the color specification function FU1, and the color specification portion U1. Steps S104 to S106 of FIG. 7 correspond to the adjustment direction setting step ST2, the adjustment direction setting function FU2, and the adjustment direction setting portion U2. Steps S108 to S114 of FIG. 7 correspond to the patch disposition step ST3, the patch disposition function FU3, and the patch disposition portion U3. Description of "step" will be omitted below.

When the process for producing the color chart for color selection that is indicated in FIG. 7 is started, the host device 100 receives the specification of adjustment point P0 in a predetermined color space (S102). The adjustment point P0 represents the coordinates of the color space that receives the specification. For example, as indicated in FIG. 8A, in a case where the specification of adjustment point P0 is received in the Lab color space (profile connection space CS3), the adjustment point P0 is represented by the Lab value (L0, a0, and b0). In addition, as indicated in FIG. 8B, in a case where the specification of the adjustment point P0 is received in the CMYK color space (CS1), the adjustment point P0 is represented by the CMYK values (C0, M0, Y0, and K0). In a case where the color patch PC0 is disposed with reference to the Lab color space (CS3), the CMYK values (C0, M0, Y0, and K0) may be converted to the Lab values (L0, a0, and b0) in accordance with the input profile 610. As indicated in FIG. 8C, in a case where the specification of the adjustment point P0 is received in the cmyk color space (CS2), the adjustment point P0 is represented by the cmyk values (C0, m0, y0, and k0). In a case where the color patch PC0 is disposed with reference to the Lab color space (CS3), the cmyk values (C0, m0, y0, and k0) may be converted to the Lab values (L0, a0, and b0) in accordance with the output profile 620.

After the specification of the adjustment point P0, the host device 100 displays an adjustment direction settings screen 800 that is indicated in FIG. 9 on the display device 115 (S104). The adjustment direction settings screen 800 has buttons and the like such as a hue direction setting region 810, a light direction setting region 820, and a save button 830. The hue direction setting region 810 has a None button 811, a Yellow button 812, a Red button 813, a Magenta button 814, a Blue button 815, a Cyan button 816, a Green button 817, and a check box 818. The light direction setting region 820 has a light direction range selection region 821 and a dark direction range selection region 822.

On the adjustment direction settings screen 800, the host device 100 receives the adjustment direction D1 that adjusts the initial color CL1 and the specification of the adjustment range in the Lab color space (CS3) using the input device 116 (S106). Note that, the Lab color space has a plurality of axes (L-axis, a-axis, and b-axis) that intersect each other, the a-axis is an example of a first axis, the b-axis is an example of a second axis, and the L-axis is an example of a third axis.

On the hue direction setting region 810, the host device 100 receives the settings of the adjustment direction D1 in a hue direction that is determined by the a-axis and the b-axis. The buttons 812-817 that indicate six hues are in the hue direction setting region 810, and the adjustment direction D1 is set from the adjustment point P0 when any of buttons 812-817 are operated. Note that, on the None button 811, the adjustment direction D1 is not specified, therefore detailed explanation is omitted.

FIG. 10 schematically exemplifies a color patch usable region A0 that is set in the Lab color space (CS3). Prior to setting the adjustment direction D1, the hexagonal columnar shape color patch usable region A0 is assumed to include the initial color CL1 in the Lab color space (CS3). The color patch usable region A0 is divided into a triangular prism TR0 of yellow, red, magenta, blue, cyan, and gray. In addition, in the color patch usable region A0, a light direction adjustment range AH and a dark direction adjustment range AL are assumed from lightness L of the initial color CL1, and the virtual plane PL0 is assumed that passes through the initial color CL1 or the reference color CL2. The virtual plane P0 is parallel to a hue plane that includes the a-axis and the b-axis, and is along the a-axis and the b-axis. The color patch PC0 that is disposed in each color chart CH1 and CH2 is a color of the virtual plane PL0 that corresponds to the initial color CL1 or the reference color CL2. In the hue direction setting region 810 that is indicated in FIG. 9, setting of the adjustment direction D1 is received so as to be a direction along the virtual plane PL0.

Figure 11A:
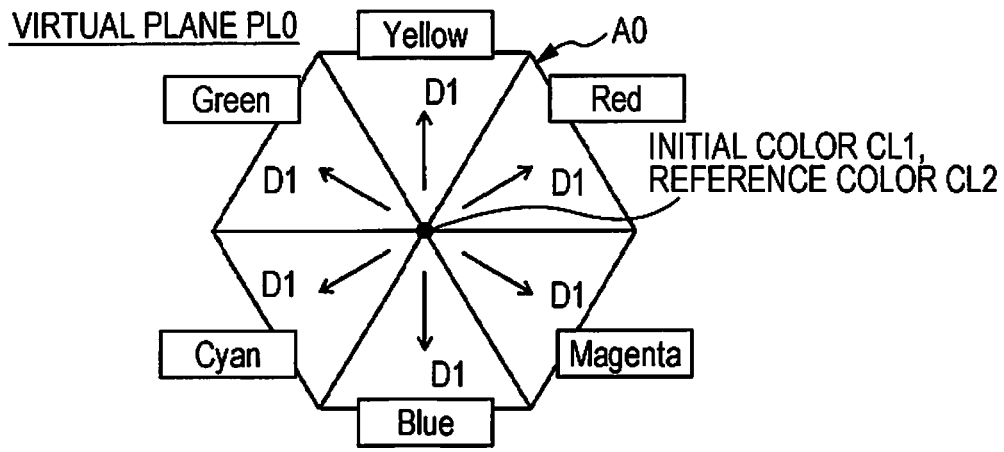
FIGS. 11A to 11C are diagrams schematically illustrating an example of the adjustment direction along a virtual plane.
Figure 11B:
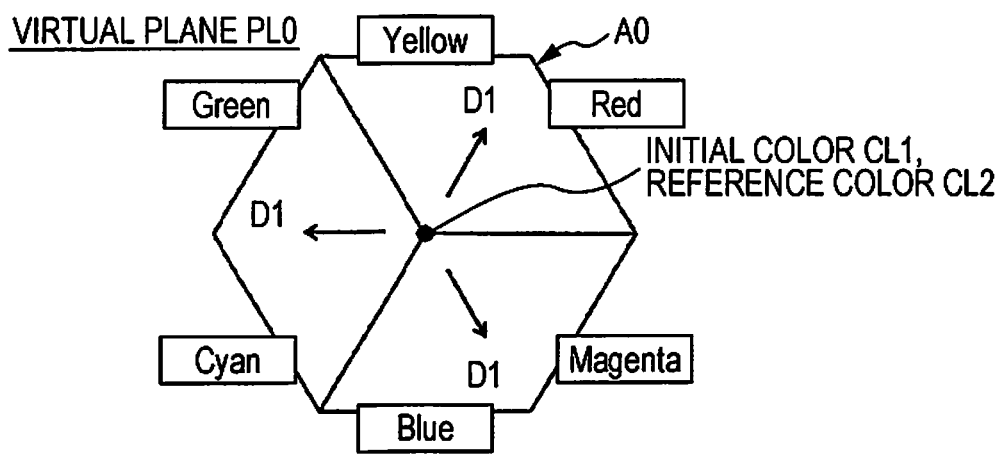
Figure 11C:
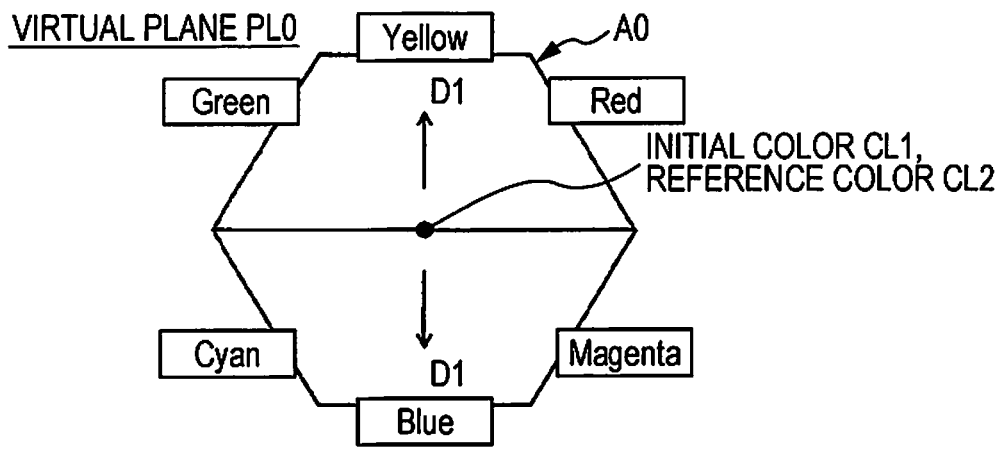

FIGS. 11A to 11C schematically exemplify the adjustment direction D1 according to the operation of the buttons 812-817 of the hue direction setting region 810.

FIG. 11A indicates the adjustment direction D1 along the virtual plane PL0 in a case where any one of buttons 812-817 is operated. For example, in a case where the Yellow button 812 is operated, a yellow region is selected. In this case, the adjustment direction D1 from the initial color CL1 or the reference color CL2 is set in an upward direction (roughly +b-axis direction) in FIG. 11A. In a case where the Blue button 815 is operated, the adjustment direction D1 is set in a downward direction (roughly −b-axis direction) in FIG. 11A.

When the check box 818 of the hue direction setting region 810 that is indicated in FIG. 9 is operated and "the adjacent direction is included in a chart" is enabled, it is possible to operate two or more buttons that are adjacent from among the buttons 812-817. FIG. 11B indicates the adjustment direction D1 along the virtual plane PL0 in a case where buttons at two locations that are adjacent from among the buttons 812-817 are operated. For example, in a case where the Yellow button 812 and the Red button 813 are operated, a yellow region and a red region are selected. In this case, the adjustment direction D1 from the initial color CL1 or the reference color CL2 is set in a right and upward direction in FIG. 11B. FIG. 11C indicates the adjustment direction D1 along the virtual plane PL0 in a case where buttons at three locations that are adjacent from among the buttons 812-817 are operated. For example, in a case where the Yellow button 812, the Red button 813, and the Green button 817 are operated, a yellow region and a red region are selected, both sides regions are selected in the yellow region. In this case, the adjustment direction D1 from the initial color CL1 or the reference color CL2 is set in an upward direction in FIG. 11C.

In addition, in a case where "the adjacent direction is included in a chart" is enabled, when one button out of the buttons 812-817 is operated, the corresponding region and the region on both sides thereof may be selected and processed.

As above, the host device 100 receives one or more directions of a portion from among six directions along the virtual plane PL0 as the direction that corresponds to the adjustment direction D1. It is obvious that the choice is not limited to six directions, for example, there may be three directions of a yellow direction, a magenta direction, and a cyan direction, four directions of a +a direction, a −a direction, a +b direction, and a −b direction, seven or more directions, and the like.

In the light direction setting region 820, the host device 100 receives the specifications of the adjustment range in the lightness direction (L-axis direction). In the light direction range selection region 821 of the light direction setting region 820, the specification of the range is received in which the reference color CL2 brightens from the initial color CL1 (L value increases). In the dark direction range selection region 822 of the light direction setting region 820, the specification of the range is received in which the reference color CL2 darkens from the initial color CL1 (L value reduces). In each region 821 and 822, it is possible to independently select any one choice from among the choices of "wide", "normal", and "narrow". Giving one example, concerning a maximum lightness difference (light direction adjustment range AH and dark direction adjustment range AL) of the initial color CL1 and the reference color CL2, when the specification of "normal" is a lightness difference 10, the specification of "wide" is larger than the lightness difference 10 (for example, lightness difference 20), and the specification of "narrow" is smaller than the lightness difference 10 (for example, lightness difference κ).

As above, the host device 100 receives the specification of a range of movement along the L-axis from the initial color CL1 to the reference color CL2.

When receiving operation of the save button 830, the host device 100 confirms the adjustment direction D1 according to the button that is operated in the hue direction setting region 810 and the lightness direction adjustment range (light direction adjustment range AH and dark direction adjustment range AL) according to the choice that is operated in the light direction setting region 820. In the operation of the hue direction setting region 810, the adjustment direction D1 is set along the virtual plane PL0 in the Lab color space (CS3). In the operation of the light direction setting region 820, a range in which the reference color CL2 moves from the initial color CL1 along the L-axis is set, as a result, the reference color CL2 is determined based on the initial color CL1.

For example, it is assumed that the printing material on which the target color of a blue line is to be reproduced is shifted to become darker in a yellow direction and a reproduction color is adjusted to become bright in a blue direction at an adjustment point that corresponds to the target color. On the adjustment direction settings screen 800 indicated in FIG. 9, the user is able to enable "the adjacent direction is included in a chart" by operating the check box 818, select the blue region, magenta region, and cyan region by operating the Blue button 815, the Magenta button 814, and the Cyan button 816, and set the adjustment direction D1 in the blue direction (downward direction in FIG. 11C). Simply, it is also possible to set the adjustment direction D1 in the blue direction by operating the Blue button 815.

In addition, the user is able to normally set the light direction adjustment range AH by operating "normal" in the light direction range selection region 821 and set to narrow the dark direction adjustment range AL by operating "narrow" in the dark direction range selection region 822.

Figure 12:
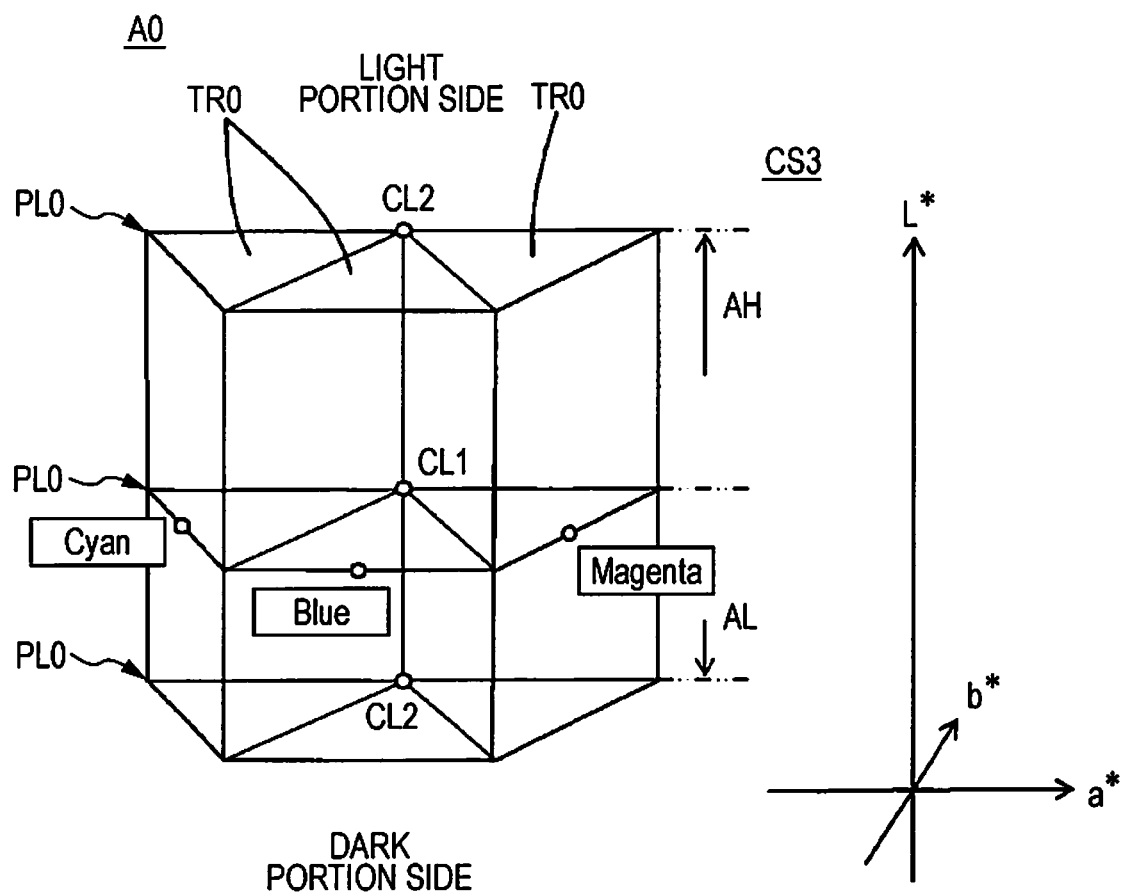
FIG. 12 is a diagram schematically illustrating an example of setting a range of the color patch usable region.

The color patch usable region A0 after the above operations is exemplified in FIG. 12. The color patch usable region A0 that is indicated in FIG. 12 is limited to the blue region and a region on both side thereof, and the dark direction adjustment range AL becomes narrower than the light direction adjustment range AH.

After setting the adjustment direction D1 and the adjustment ranges AH and AL, the host device 100 produces color chart original data (S108). The color chart original data is data in which the color of each color patch PC0 of the color chart for color selection CH0 is reproduced on the material to be printed ME1, and includes original data that represents the first color chart CH1 that includes the adjustment target color patch PA1 of the initial color CL1 and original data that represents the second color chart CH2 that includes the reference color patch PA2 of the reference color CL2.

FIG. 13 exemplifies a circumstance in which the lightness L of the reference color CL2 is set based on the adjustment ranges AH and AL in the L-axis direction from the initial color CL1, and the virtual plane PL0 that includes the reference color CL2 is set. Concerning the reference color CL2 of the dark direction adjustment range AL from the initial color CL1, the lightness L is set so as to reduce by units of a lightness difference ΔL1 from the initial color CL1. In this arrangement, ΔL1>0. Concerning the reference color CL2 of the light direction adjustment range AH from the initial color CL1, the lightness L is set so as to increase by units of a lightness difference ΔL2 from the initial color CL1. In this arrangement, ΔL2>0. In the example that is indicated in FIG. 13, since the dark direction adjustment range AL is narrower than the light direction adjustment range AH, the number of the reference color CL2 of the dark direction adjustment range AL is smaller than the number of the reference color CL2 of the light direction adjustment range AH. In addition, since the second color chart CH2 that includes the reference color patch PA2 is produced, the virtual plane PL0 that includes the reference color CL2 is also set.

Concerning the first color chart CH1 that includes the adjustment target color patch PA1, as indicated in FIGS. 4 to 6, the adjustment target color patch PA1 is disposed in the approximate end portion of the counter adjustment direction D2, and the remainder of the color patch PC0 with the same lightness L is disposed so as to have a gap of Δa1 in the a-axis direction and a gap of Δb1 in the b-axis direction. Accordingly, the color patch PC0 with the same lightness is disposed in the first color chart CH1 such that the adjustment direction D1 from the adjustment target color patch PA1 is wider than the counter adjustment direction D2 from the adjustment target color patch PA1. Each color patch PC0 of the first color chart CH1 is the color of the virtual plane PL0 that includes the initial color CL1.

Concerning the second color chart CH2 that includes the reference color patch PA2, the reference color patch PA2 is disposed so as to have the same positional relationship as the adjustment target color patch PA1 of the first color chart CH1, and the remainder of the color patch PC0 with the same lightness L is disposed so as to have a gap of Δa1 in the a-axis direction and a gap of Δb1 in the b-axis direction. Accordingly, the color patch PC0 with the same lightness is disposed in the second color chart CH2 such that the adjustment direction D1 from the reference color patch PA2 is wider than the counter adjustment direction D2 from the reference color patch PA2. The second color chart CH2 is prepared for the number of reference colors CL2. Each color patch PC0 of the second color chart CH2 is the color of the virtual plane PL0 that includes the reference color CL2. Each color patch PC0 of the color charts CH1 and CH2 is disposed such that the lightness L of the Lab color space at the same position becomes the difference ΔL1 or ΔL2.

Note that, in a case of being outside of the triangular prism TR0 for which the color of the color patch disposed in advance is selected (for example, refer to FIG. 12), the color patch may be disposed in the color chart CH0, or instead, information may be attached that indicates that there is no original color patch such as a gray patch or a broken line frame.

In the process of S108, color chart original data is produced that reproduces the group of the color patch PC0 with the same lightness L that includes the adjustment target color patch PA1 and the group of the color patch PC0 with the same lightness L that includes each reference color patch PA2 on the material to be printed ME1. The color chart original data may be represented by the Lab value, and may be converted to the cmyk value in accordance with the output profile 620 in which the correspondence relationship between the Lab value and cmyk value is specified.

After production of the color chart original data, the host device 100 adds the information M1 that indicates the target patch PA0 to the color chart original data (S110). In the case of the first color chart CH1 that is indicated in FIG. 4, the solid line frame that surrounds the adjustment target color patch PA1 and the character string such as "current color" directly below the adjustment target color patch PA1 are added to the color chart original data with different colors from the adjustment target color patch PA1. In the case of the second color chart CH2 that is indicated in FIG. 4, the solid line frame that surrounds the reference color patch PA2 and the character string such as "reference color" directly below the reference color patch PA2 are added to the color chart original data with different colors from the reference color patch PA2.

After addition of the information M1 that indicates the target patch, the host device 100 adds the information M2 that indicates the adjustment direction D1 to the color chart original data (S112). In the case of the first color chart CH1 that is indicated in FIG. 4, the arrow that indicates the adjustment direction D1 from the adjustment target color patch PA1 and the character string such as "adjustment direction" in the vicinity of the arrow are added to the color chart original data with different colors from the adjustment target color patch PA1 and the neighboring color patch PC0. In the case of the second color chart CH2 that is indicated in FIG. 4, the arrow that indicates the adjustment direction D1 from the reference color patch PA2 and the character string such as "adjustment direction" in the vicinity of the arrow are added to the color chart original data with different colors from the reference color patch PA2 and the neighboring color patch PC0.

After addition of the information M2 that indicates the adjustment direction, the host device 100 prints the color chart for color selection CH0 by transmitting the corrected color chart original data to the ink jet printer 200 as the final color chart data (S114), and ends the process for printing the color chart for color selection. In a case where the color chart data is not represented by the cmyk value, for example, the color chart data may be converted to the cmyk value in accordance with the output profile 620 in which the correspondence relationship between the Lab value and cmyk value is specified. The printer 200 that receives the color chart data prints the color chart CH0 that has a plurality of the color patches PC0 which include the target patch PA0 on the material to be printed ME1 along with the information M1 and M2 that indicates the target patch PA0 and the adjustment direction D1. Thereby, a printing material PT1 of the color chart for color selection CH0 is obtained in which the adjustment direction D1 from the target patch PA0 is wider than the counter adjustment direction D2 from the target patch PA0.

FIG. 14 schematically exemplifies an action of the color chart for color selection CH0. In a case where the adjustment target color patch PA1 is disposed in the center (position C3) of the group of the color patch PC0 in the manner of printing material PT9 of a color chart for color selection CH9 that is indicated in the upper portion in FIG. 14, the search of the color patch closest to the target color from the color chart CH9 is limited to a range AR9. In the color chart CH9 that is indicated in FIG. 14, since the left and upward direction from the adjustment target color patch PA1 is a search direction (direction to be adjusted), the search range AR9 is limited to three color patches in the lateral direction and three color patches in the vertical direction that are included in the adjustment target color patch PA1. The color patch with the search range AR9 out of the color chart CH9 excluded is not of interest when searching.

In a case where the adjustment target color patch PA1 is disposed in the approximate end portion (position ES) in the counter adjustment direction of the group of the color patch PC0 in the manner of printing material PT8 of a color chart for color selection CH8 that is indicated in the lower portion in FIG. 14, the search of the color patch closest to the target color from the color chart CH8 is limited to a range AR8. In the color chart CH8 that is indicated in FIG. 14, since the left and upward direction form the adjustment target color patch PA1 is a search direction (direction to be adjusted), the search range AR8 is increased to five color patches in the lateral direction and five color patches in the vertical direction that are included in the adjustment target color patch PA1.

The color patch, which is from the adjustment target color patch PA1 to the side of the counter adjustment direction, has a low likelihood of being selected. The color patch, which is from the adjustment target color patch PA1 to the side of the adjustment direction, has a high likelihood of being selected. It is possible to make it easier to view the color patch closest to the target color and search for a color patch closer to the target color by widening the search range AR8.

In addition, the search range is also widened in the second color chart CH2 that includes the reference color patch PA2 with a different lightness L from the adjustment target color patch PA1. Therefore, even in a case where the lightness of the color closest to the target color is different from the lightness of the adjustment target color patch PA1, it is possible to make it easier to view the color patch closest to the target color and search for a color patch closer to the target color.

As above, the present specific example is able to provide a color chart for color selection that makes it easier to search a target color patch.

The color chart for color selection CH0 described above is able to be used in adjustment of the profile 500. For example, in a case where the input profile 610 is adjusted in which the correspondence relationship between the CMYK value and the Lab value is specified, it is possible to produce the color chart CH0 for adjustment of the input profile in accordance with the process for producing the color chart for color selection that is indicated in FIG. 7. In this case, if the Lab value (L0, a0, and b0) that represents the adjustment point P0 is set as the initial color CL1 and the reference color CL2 is set such that the lightness L of the initial color CL1 changes when passing through gaps ΔL1 and ΔL2, it is possible to dispose the color patch PC0 in the color charts CH1 and CH2 based on the initial color CL1 and the reference color CL2. It is possible to convert the color chart original data that is represented by the Lab value to the cmyk value in accordance with the output profile 620 in which the correspondence relationship between the Lab value and cmyk value is specified. When the color patch with the closest color to the target color from the color chart for color selection CH0 that is produced in accordance with the color chart data is selected, it is possible to acquire the Lab values (L0', a0', and b0') of the original data that forms the selected color patch. When the original Lab values (L0, a0, and b0) of the input profile 610 at the adjustment point P0 are replaced with the Lab values (L0', a0', and b0'), the input profile 610 is adjusted.

It is obvious that even in the adjustment of the profile such as the output profile 620 or the device link profile 630, in the same manner, it is possible to use the color chart for color selection CH0. In addition, even outside of profile adjustment, it is possible to use the color chart for color selection CH0.

(6) Modification Examples

The invention is considered to have various modification examples.

For example, the output device is not limited to the ink jet printer, and may be an electrophotographic printer such as a laser printer, a three-dimensional printer, a display device, or the like.

The type of color material that forms an image is not limited to C, M, Y, and K, and in addition to C, M, Y, and K, may include color materials such as dark yellow (Dy), orange (Or), green (Gr) with a higher concentration than Lc, Lm, and Y, color materials such as light black (Lk) with a lower concentration than K, unpigmented color materials for image quality improvement, or the like.

The target device is not limited to the target printing machine, and may be a display device or the like.

The color space of the reference in which the color patch is disposed in the color chart for color selection is not limited to the Lab color space, and may be an RGB color space that has an R-axis, a G-axis, and a B-axis, a CMY color space that has a C-axis, an M-axis, and a Y-axis, a CMYK color space that has a C-axis, an M-axis, a Y-axis, and a K-axis, or the like.

The processes described above are able to be modified, as appropriate, such that the order is changed or the like. For example, in the process in FIG. 7, the process of S112 in which the information M2 that indicates the adjustment direction D1 is added is able to be performed before the process in S110 in which the information M1 that indicates the target patch PA0 is added.

In the embodiment described above, the hexagonal columnar shape color patch usable region A0 is assumed, but the color patch usable region may be a rectangular cube shape (including a cube) or the like.

Reception of the settings of the adjustment direction D1 may be carried out using a graphical user interface (GUI) such as a color circle. In addition, the adjustment direction D1 may not be directly specified, and a direction in which the color of the color patch is shifted may be specified using the GUI, and the host device 100 may calculate the adjustment direction D1 based on the direction.

The position of the adjustment target color patch PA1 in the first color chart CH1 and the position of the reference color patch PA2 in the second color chart CH2 may be different.

An aspect in which the adjustment direction from the target patch is wider than the counter adjustment direction from the target patch is not limited to a distance ratio of {L1/(L1+L2)} being set to 0.4 or less.

For example, even if the number of color patches (N2) in the adjustment direction from the target patch is greater than the number of color patches (N1) in the counter adjustment direction from the target patch (that is, N1<N2), it is considered that the adjustment direction from a target patch is wider than the counter adjustment direction from the target patch. In the examples that are indicated in FIGS. 5 and 6, since N=1 and N2=4, it is considered that the adjustment direction D1 from the target patch PA0 is wider than the counter adjustment direction D2 from the target patch PA0. The ratio {N1/(N1+N2)} of the number of color patches is preferably 0.4 or less, more preferably 0.3 or less, and further preferably 0.2 or less. It is also possible that {N1/(N1+N2)}≤0.1.

In addition, the color chart CH0 may be divided into two by a straight line that passes through the center C0 of the target patch PA0 orthogonal to the adjustment direction D1 and the counter adjustment direction D2, and the area of the color chart CH0 on the adjustment direction D1 side from the straight line may be greater than the area of the color chart CH0 on the counter adjustment direction D2 side from the straight line. The printing area of the color patch PC0 on the adjustment direction D1 side from the straight line may be greater than the printing area of the color patch PC0 on the counter adjustment direction D2 side from the straight line. Furthermore, the adjustment direction from the target patch may be wider than the counter adjustment direction from the target patch based on the size of the region in the reference color space in which the color patch is disposed.

The information M1 that indicates the target patch PA0 is not limited to the example that is indicated in FIG. 4, and various examples are possible such as the information that is indicated in FIGS. 15A to 15D and 16A to 16D.

Figure 15A:
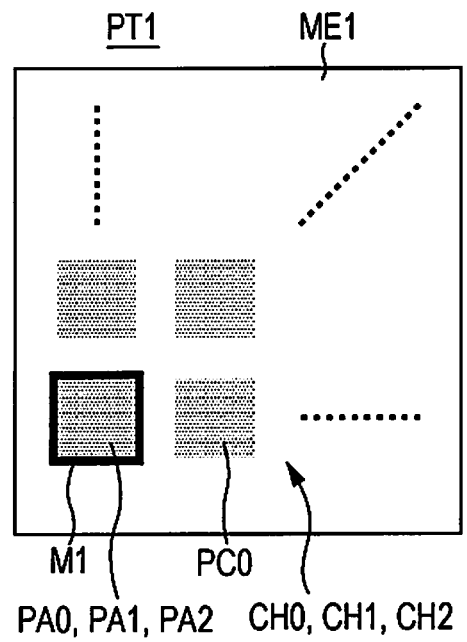
FIGS. 15A to 15D are diagrams schematically illustrating various examples of information that indicates a target patch.
Figure 15B:
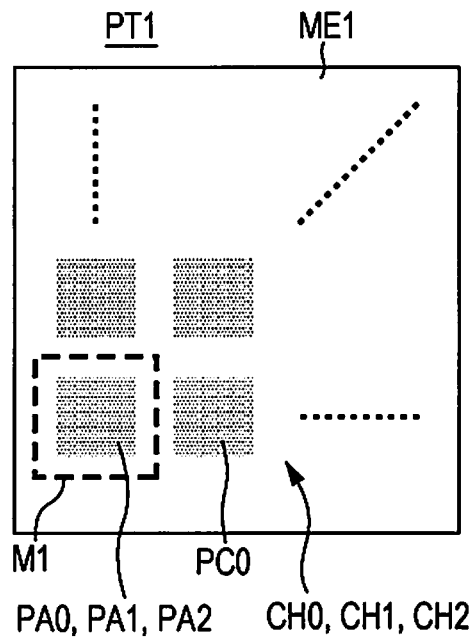

FIG. 15A indicates an example in which the solid line frame is used that surrounds the target patch PA0 as the information M1 that indicates the target patch. The solid line frame contacts the target patch PA0, but the solid line frame may be separated from the target patch PA0. FIG. 15B indicates an example in which a broken line frame is used that surrounds the target patch PA0 as the information M1 that indicates the target patch. The broken line frame is separated from the target patch PA0, but the broken line frame may contact the target patch PA0. The color that is used for the frame is a color that is different from the color of the target patch PA0 (initial color CL1 or reference color CL2), and for example, is preferably an inverse hue color or achromatic color. A frame may be attached not at the adjustment target color patch PA1 or the reference color patch PA2 but to surround the adjustment target color patch PA1 with a solid line frame, to surround the reference color patch PA2 with a broken line frame as indicated in FIG. 4, or the like.

Figure 15C:
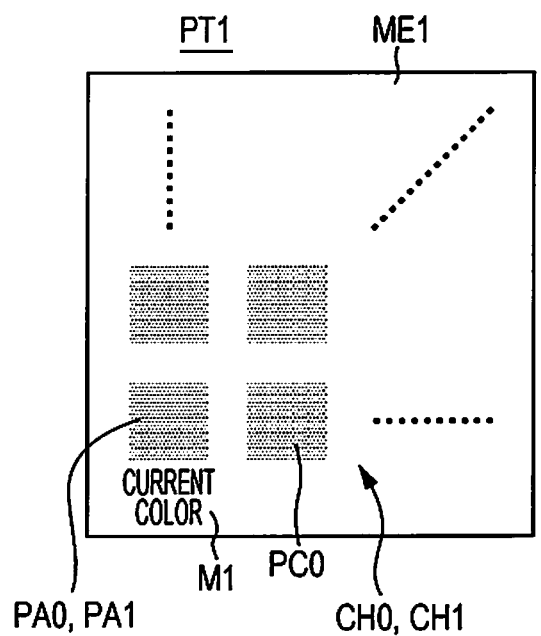
Figure 15D:
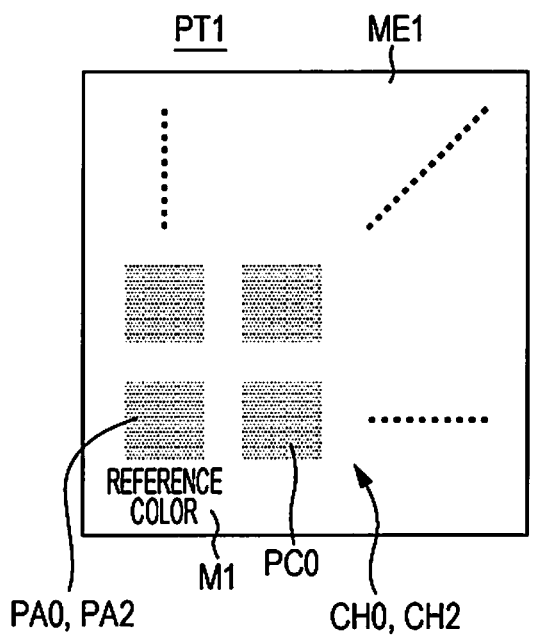

FIG. 15C indicates an example in which a character string is attached to the adjustment target color patch PA1 as the information M1 that indicates the adjustment target color patch. FIG. 15D indicates an example in which a character string is attached to the reference color patch PA2 as the information M1 that indicates the reference color patch. Also in the case of the character string, a color that is different from the color of the target patch PA0 is used, and for example, is preferably an inverse hue color or achromatic color.

Figure 16A:
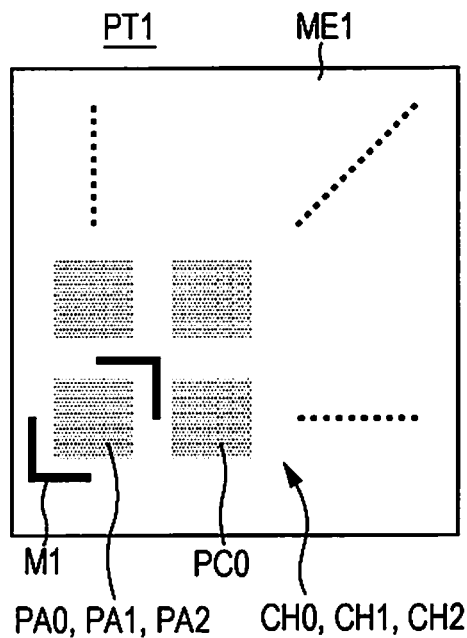
FIGS. 16A to 16D are diagrams schematically illustrating various examples of information that indicates a target patch.
Figure 16B:
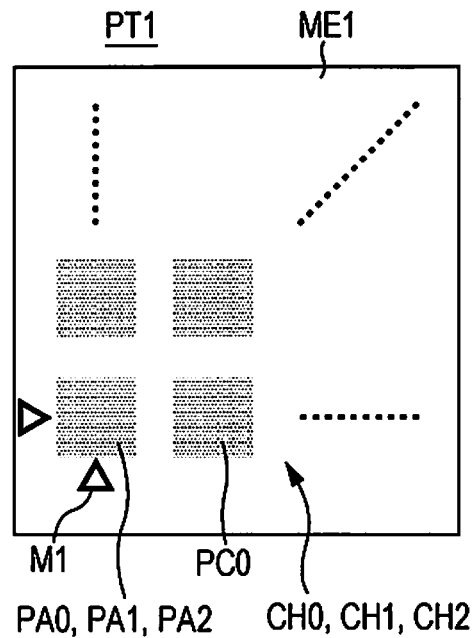

FIG. 16A indicates an example in which a hook-shaped marker (example of a mark) is attached to the target patch PA0 as the information M1 that indicates the target patch. FIG. 16B indicates an example in which a triangular-shaped marker (example of a mark) is attached to the target patch PA0 as the information M1 that indicates the target patch. Also in the case of the marker, a color that is different from the color of the target patch PA0 is used, and for example, is preferably an inverse hue color or achromatic color. As long as the target patch PA0 is emphasized, the shape of the mark does not matter.

Figure 16C:
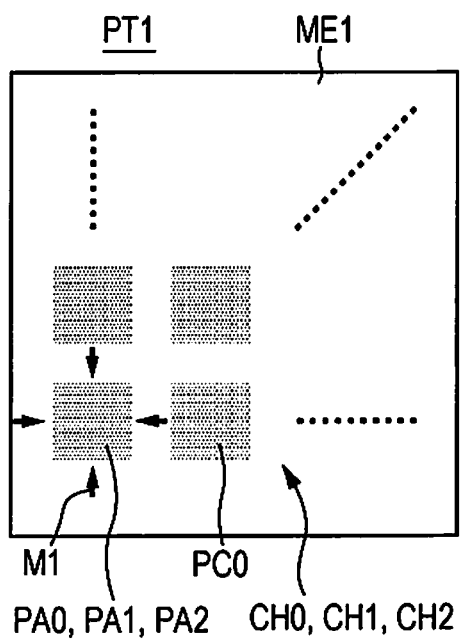
Figure 16D:
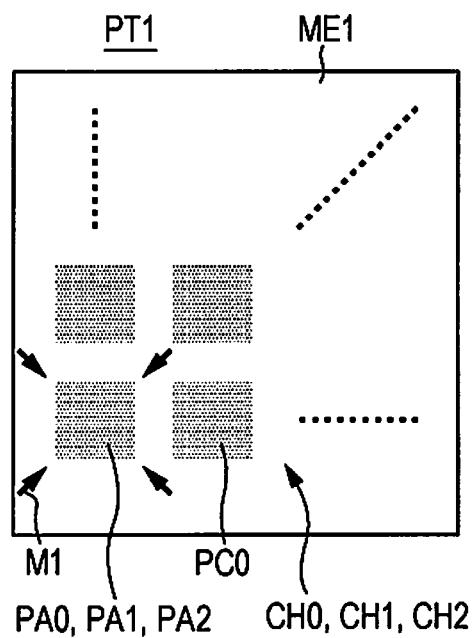

FIGS. 16C and 16D indicate an example in which an arrow that points to the target patch PA0 is used as the information M1 that indicates the target patch. Also in the case of the arrow, a color that is different from the color of the target patch PA0 is used, and for example, is preferably an inverse hue color or achromatic color.

Note that, various information M1 that is described above may be represented in the color chart CH0 by combining two or more types of information.

The information M2 that indicates the adjustment direction D1 is not limited to the example that is indicated in FIG. 4, and various examples are possible such as the information that is indicated in FIGS. 17A to 17D.

FIG. 17A indicates an example in which an arrow is used as the information M2 that indicates the adjustment direction. The arrow is separated from the target patch PA0, but the arrow may contact the target patch PA0. FIG. 17B indicates an example in which a character string is used along with an arrow as the information M2 that indicates the adjustment direction. FIG. 17C indicates an example in which only a character string is used as the information M2 that indicates the adjustment direction. In the example that is indicated in FIG. 17C, a direction in which a character string such as "adjustment direction" is attached from the target patch PA0 is the adjustment direction D1. FIG. 17D indicates an example in which a line M2a (in FIG. 17D, a broken line with a lateral orientation and a vertical orientation) is used that represents the a-axis direction and the b-axis direction of the Lab color space in addition to a line (horizontal broken line in FIG. 17D) as the information M2 that indicates the adjustment direction. The colors that are used for the arrow, character string, line as the information M2 that indicates the adjustment direction, and the line that represents the axial direction of the color space are different from the color of the target patch PA0, and for example, is preferably an inverse hue color or achromatic color.

Various information M1 and M2 described above is able to be used in an arbitrary combination. For example, in the color chart CH0 that is indicated in FIG. 4, a frame that surrounds the target patch PA0 and a character string that is attached to the target patch PA0 are combined as the information M1 that indicates the target patch, and the arrow and the character string are combined as the information M2 that indicates the adjustment direction D1.

Figure 18:
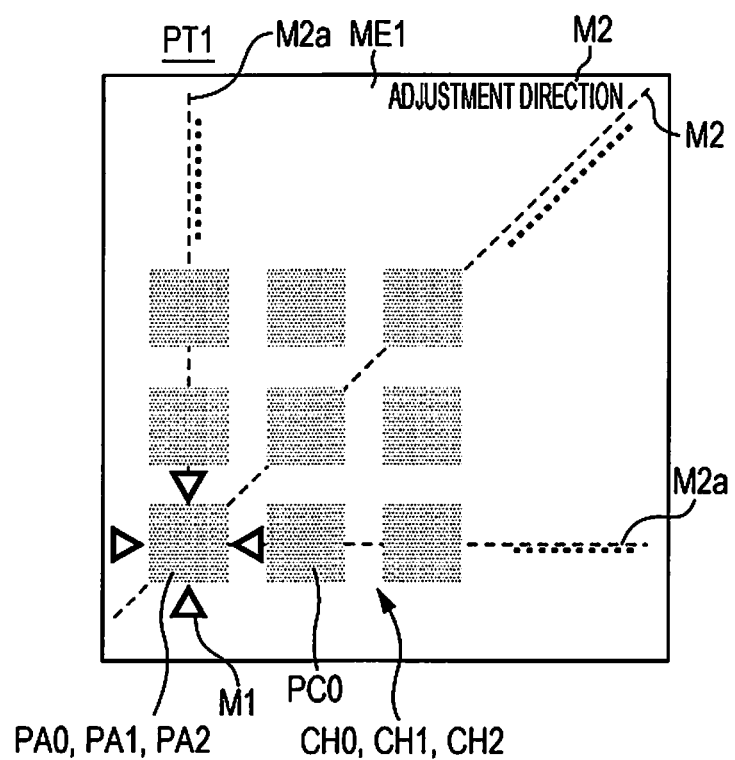
FIG. 18 is a diagram schematically illustrating another example of a color chart for color selection.

In the color chart CH0 that is indicated in FIG. 18, a triangular-shaped marker is used that is attached to the target patch PA0 in every direction as the information M1 that indicates the target patch PA0, and the line (diagonal broken line in FIG. 18), the character string, and the line M2a (broken line in lateral orientation and vertical orientation in FIG. 18) that represents the a-axis direction and the b-axis direction are combined as the information M2 that indicates the adjustment direction D1.

As long as the target patch is recognizable, the information that indicates the target patch may not be necessary. As long as the adjustment direction is recognizable, the information that indicates the adjustment direction may not be necessary. For example, in the color chart CH0, in an aspect in which the target patch PA0 is larger than the remaining color patch PC0 or is different from the remaining color patch PC0, it is possible to specify the target patch PA0 in the color chart CH0. In addition, in a case where the target patch PA0 is an approximate corner portion (corner or the vicinity thereof) of the color chart CH0, the direction from the target patch PA0 to the opposite angle of the color chart CH0 is set as the adjustment direction D1. In a case where the target patch PA0 is an approximate middle portion (corner or the vicinity thereof) of the color chart CH0, the direction from the target patch PA0 to the approximate middle portion of the opposite side of the color chart CH0 is set as the adjustment direction D1.

Figure 19:
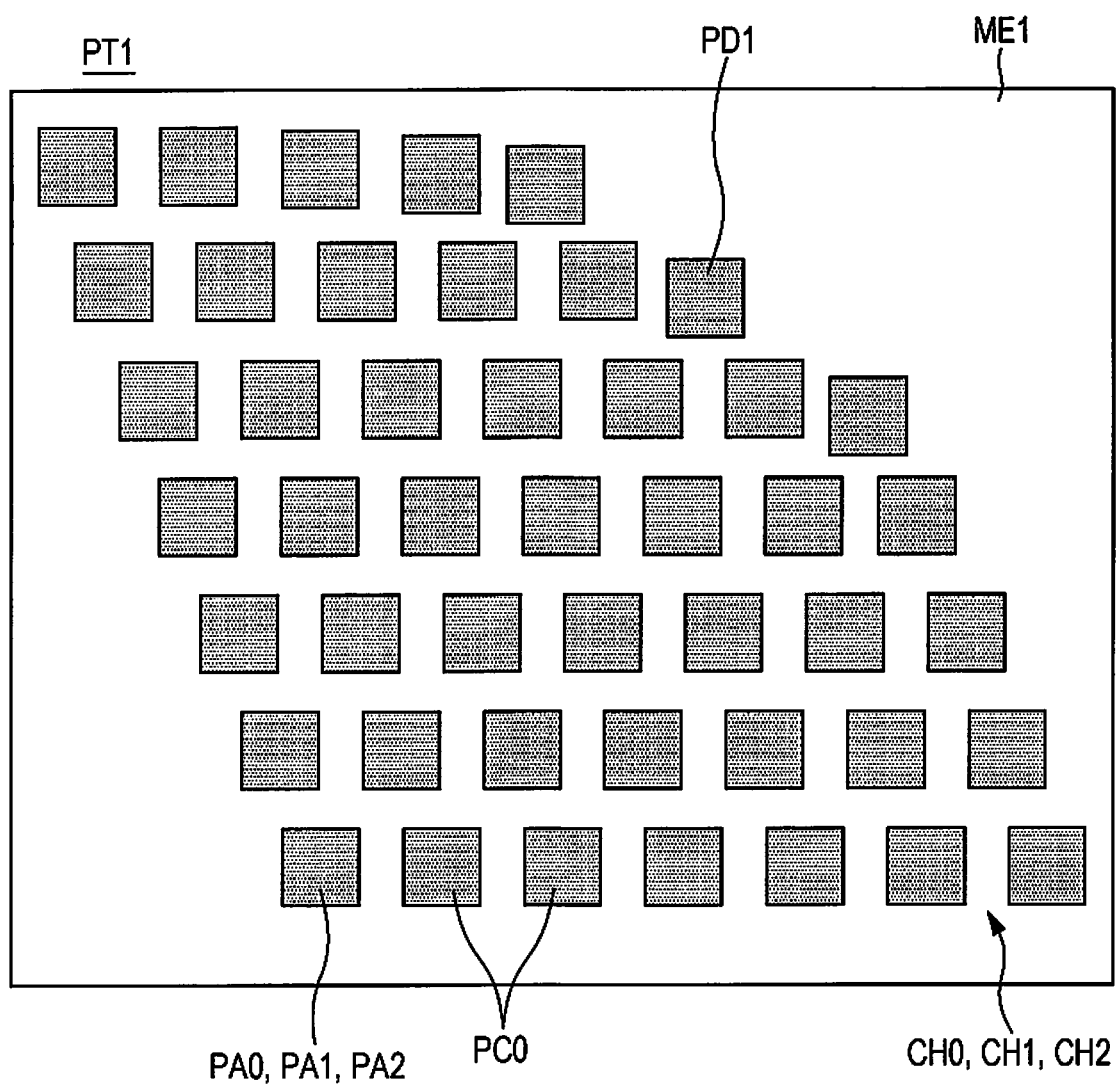
FIG. 19 is a diagram schematically illustrating another example of a color chart for color selection.

Furthermore, it is assumed that the Yellow button 812 and the Red button 813 are operated in the hue direction setting region 810 that is indicated in FIG. 9, and the adjustment direction D1 is set in the right and upward direction as indicated in FIG. 11B. In this case, the color patch PC0 may be disposed in the color chart CH0 in a fan shape at approximately 120° that includes the yellow direction and the red direction with the target patch PA0 as the origin in the manner of the color chart CH0 that is indicated in FIG. 19. In the color chart CH0 that is indicated in FIG. 19, it is possible to specify the target patch PA0 from the fan shape disposition of the color patch PC0, and it is possible to specify, as the adjustment direction D1, the direction from the target patch PA0 toward the color patch PD1 that is a middle portion of an arc centered on the target patch PA0.

Figure 20:
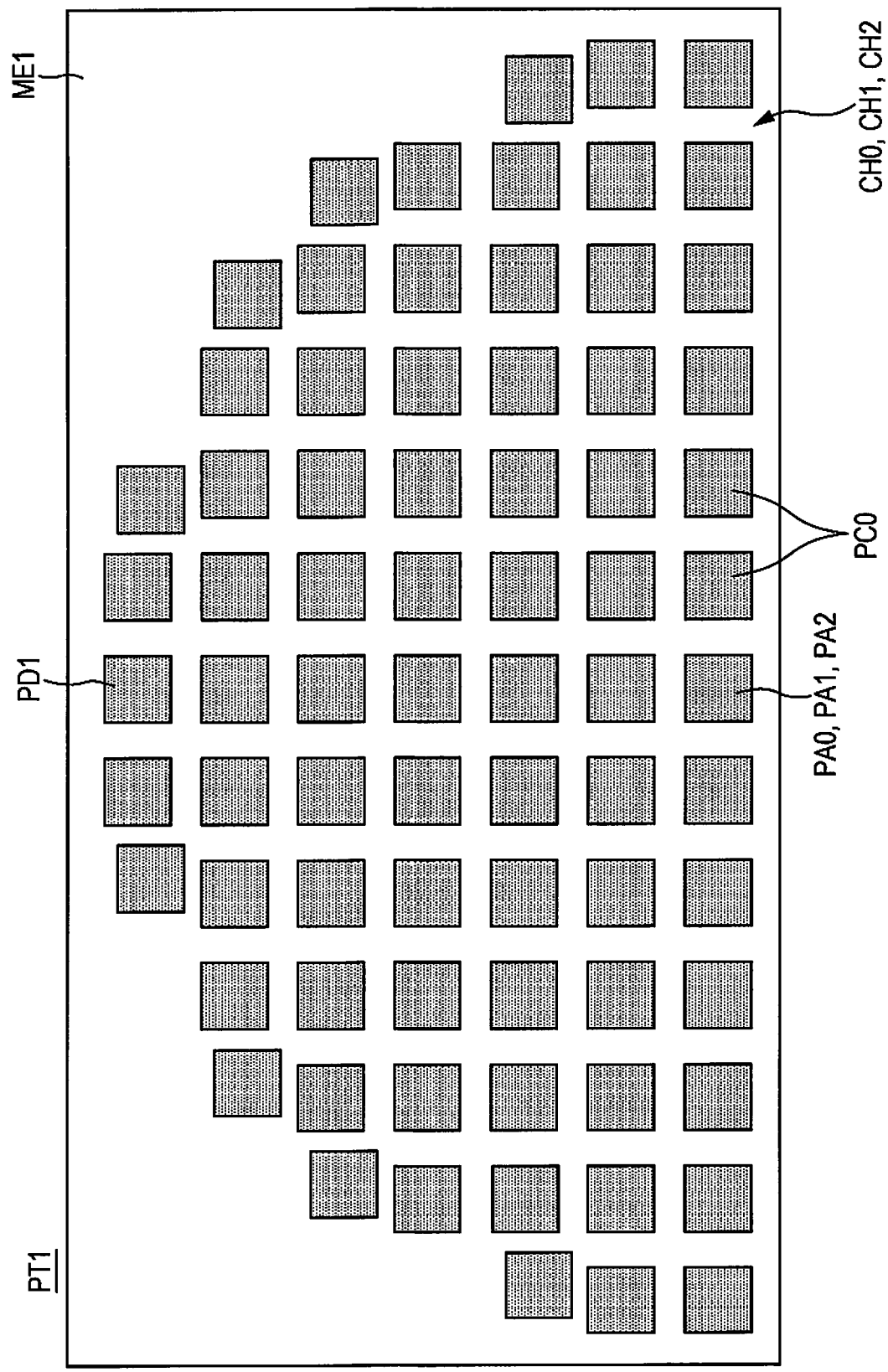
FIG. 20 is a diagram schematically illustrating another example of a color chart for color selection.

Furthermore, it is assumed that the Yellow button 812, the Red button 813, and the Green button 817 are operated in the hue direction setting region 810 that is indicated in FIG. 9, and the adjustment direction D1 is set in the upward direction as indicated in FIG. 11C. In this case, the color patch PC0 may be disposed in the color chart CH0 in a fan shape at approximately 180° that includes the yellow direction, the red direction, and the green direction with the target patch PA0 as the origin in the manner of the color chart CH0 that is indicated in FIG. 20. In the color chart CH0 that is indicated in FIG. 20, it is also possible to specify the target patch PA0 from the fan shape disposition of the color patch PC0, and it is possible to specify, as the adjustment direction D1, the direction from the target patch PA0 toward the color patch PD1 that is a middle portion of an arc centered on the target patch PA0.

Note that, since the color patch PC0 may be disposed on the counter adjustment direction D2 side from the target patch PA0 as indicated in FIGS. 5 and 6, it may be possible to specify the degree of the distance L1 from the target patch PA0 to the end E1 of the color chart CH0 in the counter adjustment direction D2.

FIG. 21 indicates the adjustment direction settings screen 800 that has a slider control 840 that receives the specification of the degree of the distance L1. The slider control 840 is an operation portion for sensuously setting the degree of the distance L1, and is able to operate a slider 844 to move along a slider bar 842 in the lateral orientation. The host device 100 sets the distance L1 according to the position of the slider 844 that is operated by the user, disposes the target patch PA0 in the color chart CH0 so as to become the set distance L1, and prints the color chart CH0 in the printer 200.

In the examples, it is possible to easily view each color patch PC0 of the color chart CH0 according to the preference of the user, and it is possible to easily search the color patch of the target.

Note that, in the manner of the printing material PT1 that is exemplified in FIG. 22, a case where a plurality of the color charts for color selection CH0 are formed on one sheet of the material to be printed ME1 is also included in the present technology. In this arrangement, a plurality of the color patches PC0 that are included in each color chart CH0 are spaced apart by a gap ΔLp (ΔLp>0) in the lateral direction and the vertical direction, and are disposed in the color chart CH0. The gap ΔLp may be different in the lateral direction and the vertical direction, and it is also possible to set the gap ΔLp to 0. The color charts CH0 are spaced apart by a gap ΔLc in the lateral direction and disposed on the material to be printed ME1. The gap ΔLc is wider the gap ΔLp between the color patches. In a case where ΔLc>ΔLp, a plurality of the color charts for color selection CH are formed on one sheet of the material to be printed ME1. The color chart CH0 that is disposed on the material to be printed ME1 may be a combination of the first color chart CH1 and one or more second color chart CH2 as indicated in FIG. 22, and may be two or more second color charts CH2.

In each color chart CH0, the distance L1 from the target patch PA0 up to the end E1 of the color chart CH0 in the counter adjustment direction D2 is shorter than the distance L2 from the target patch PA0 up to the end E2 of the color chart CH0 in the adjustment direction D1. Accordingly, the adjustment direction D1 from the target patch PA0 is wider than the counter adjustment direction D2 from the target patch PA0 in each color chart CH0.

It is also possible to more easily search a target color patch on the printing material PT1.

(7) CONCLUSION

As explained above, according to the invention, using various aspects, it is possible to provide inter alia a technology that makes it possible to more easily search a target color patch. It is obvious that no matter the technology consisting of the configuration requirements according to the independent claims, the basic actions and effects described above are obtained.

In addition, it is possible to implement a configuration in which each configuration that is disclosed in the examples described above are replaced with each other or modified in combination, a configuration in which well-known technologies and each configuration that is disclosed in the examples described above are replaced with each other or modified in combination, and the like. The invention includes these configurations and the like.

This application claims priority under 35 U.S.C. § 119 to Japanese Patent Application No. 2017-122243, filed Jun. 22 2017. The entire disclosure of Japanese Patent Application No. 2017-122243 is hereby incorporated herein by reference.

What is claimed is:

1. A color chart for color selection to select a color patch of the closest color to a target color from among a plurality of color patches, the color chart for color selection being a color chart for adjusting a profile which is an input profile, an output profile, or a device link profile, the color chart for color selection being a printed color chart that has been printed on a printing material, the profile being stored in a memory, the color chart for color selection comprising:
the plurality of color patches that has been printed on the printing material; and
at least one or more of an arrow, a line, or a character string that has been printed on the printing material and indicates an adjustment direction in which a color is to be adjusted from a target patch in the color chart and is arranged and represented such that at least a portion of the at least one or more of the arrow, the line, or the character string does not overlap the plurality of color patches,
wherein a color patch that represents color of either an adjustment target color or a reference color that substitutes the adjustment target color is the target patch, and
the adjustment direction from the target patch is wider than the direction counter to the adjustment direction from the target patch.

2. The color chart for color selection according to claim 1, further comprising
information that has been printed on the printing material and indicates that the color patch that represents the color of either the adjustment target color or the reference color is the target patch,
wherein the information is represented by a different color from the target patch.

3. The color chart for color selection according to claim 2, further comprising
information which has been printed on the printing material and indicates that the color patch that represents the color of either the adjustment target color or the reference color is the target patch, and which is represented by one or more sets of information is selected from a frame that surrounds the target patch, a character string that is attached to the target patch, a mark that is attached to the target patch, and an arrow that points to the target patch.

4. The color chart for color selection according to claim 2,
wherein when a distance from the target patch up to an end of the color chart for color selection in a direction counter to the adjustment direction is L1 and a distance from the target patch up to an end of the color chart for color selection in the adjustment direction is L2, {L1/(L1+L2)} is 0.4 or less.

5. The color chart for color selection according to claim 1, further comprising
information which has been printed on the printing material and indicates that the color patch that represents the color of either the adjustment target color or the reference color is the target patch, and which is represented by one or more sets of information that is selected from a frame that surrounds the target patch, a character string that is attached to the target patch, a mark that is attached to the target patch, and an arrow that points to the target patch.

6. The color chart for color selection according to claim 5,
wherein when a distance from the target patch up to an end of the color chart for color selection in a direction counter to the adjustment direction is L1 and a distance from the target patch up to an end of the color chart for color selection in the adjustment direction is L2, {L1/(L1+L2)} is 0.4 or less.

7. The color chart for color selection according to claim 1, further comprising
a line that has been printed on the printing material and represents an axial direction of a color space.

8. The color chart for color selection according to claim 1, wherein when a distance from the target patch up to an end of the color chart for color selection in a direction counter to the adjustment direction is L1 and a distance from the target patch up to an end of the color chart for color selection in the adjustment direction is L2, {L1/(L1+L2)} is 0.4 or less.

9. A method for producing a color chart for color selection to select a color patch of the closest color to a target color from among a plurality of the color patches, the color chart for color selection being a color chart for adjusting a profile which is an input profile, an output profile, or a device link profile, the profile being stored in a memory, the color chart for color selection being a printed color chart that has been printed on a printing material, the method comprising:
specifying a color for receiving color specifications of an adjustment target;
setting an adjustment direction for receiving a setting for the adjustment direction in which the color of the adjustment target is adjusted in a predetermined color space;
disposing the plurality of color patches including a target patch that represents either the adjustment target color or a reference color that substitutes the color of the adjustment target in the color chart for color selection such that the adjustment direction from the target patch is wider than the direction counter to the adjustment direction from the target patch, and disposing at least one or more of an arrow, a line, or a character string that indicates the adjustment direction from the target patch in the color chart such that at least a portion of the at least one or more of the arrow, the line, or the character string does not overlap the plurality of color patches; and
printing, on the printing material, the plurality of color patches that has been disposed, and the at least one or more of the arrow, the line, or the character string that has been disposed.

10. The method for producing a color chart for color selection according to claim 9,
wherein
the color chart for color selection includes a first color chart that includes an adjustment target color patch as the target patch and a second color chart that includes, as the target patch, a reference color patch that has a different lightness different from a lightness of the adjustment target color patch,
in the setting of the adjustment direction, the reference color is determined based on the color of the adjustment target,
in the disposing of the plurality of color patches,
the adjustment target color patch is disposed in the first color chart such that the adjustment direction from the adjustment target color patch is wider than the direction counter to the adjustment direction from the adjustment target color patch, and
the reference color patch is disposed in the second color chart such that the adjustment direction from the reference color patch is wider than the direction counter to the adjustment direction from the reference color patch.

11. The method for producing a color chart for color selection according to claim 10,
wherein a color space has a plurality of axes that intersect one another, and
in the disposing of the plurality of color patches, the reference color is determined as a color that is shifted in an axial direction of the color space from the color of the adjustment target in the color space.

12. The method for producing a color chart for color selection according to claim 10,
wherein in the disposing of the plurality of color patches, the color of the color patch that is disposed in the first color chart is a color of a virtual plane along a first axis and a second axis that are included in the plurality of axes in the color space, and
in the setting of an adjustment direction, setting of the adjustment direction is received so as to be a direction along the virtual plane.

13. The method for producing a color chart for color selection according to claim 12,
wherein in the setting of the adjustment direction, one or more directions of one portion from among three or more directions along the virtual plane are received as a direction that corresponds to the adjustment direction.

14. The method for producing a color chart for color selection according to claim 10,
wherein the plurality of axes includes a third axis, and
in the setting of the adjustment direction, the reference color is determined as a color that is shifted from the color of the adjustment target along the third axis in the color space.

15. The method for producing a color chart for color selection according to claim 14,
wherein in the setting of the adjustment direction, specification of a range in which the reference color shifts from the color of the adjustment target along the third axis is received, and the reference color is determined based on the range.

16. The method for producing a color chart for color selection according to claim 9,
wherein in the setting of the adjustment direction, specification of a degree of a distance from the target patch up to an end of the color chart for color selection in a direction counter to the adjustment direction is received, and in the disposing of the plurality of color patches, the target patch is disposed at a position based on the degree of the distance in the color chart for color selection.

17. A device for producing a color chart for color selection to select a color patch of the closest color to a target color from among a plurality of the color patches, the color chart for color selection being a color chart for adjusting a profile which is an input profile, an output profile, or a device link profile, the profile being stored in a memory, the color chart for color selection being a printed color chart that has been printed on a printing material, the device comprising:
  a processor configured to execute a plurality of portions including
    a color specification portion configured to receive color specifications of an adjustment target,
    an adjustment direction setting portion configured to receive a setting for an adjustment direction in which a color of the adjustment target is adjusted in a predetermined color space, and
    a patch disposition portion configured to dispose the plurality of color patches including a target patch that represents either the adjustment target color or a reference color that substitutes the color of the adjustment target in the color chart for color selection such that the adjustment direction from the target patch is wider than the direction counter to the adjustment direction from the target patch, and dispose at least one or more of an arrow, a line, or a character string that indicates the adjustment direction from the target patch in the color chart such that at least a portion of the at least one or more of the arrow, the line, or the character string does not overlap the plurality of color patches; and
  a printer configured to print, on the printing material, the plurality of color patches that has been disposed, and the at least one or more of the arrow, the line, or the character string that has been disposed.

* * * * *